(12) United States Patent
Gupta et al.

(10) Patent No.: US 12,184,967 B2
(45) Date of Patent: Dec. 31, 2024

(54) PROVIDING CONTEXTUAL AUGMENTED REALITY PHOTO POSE RECOMMENDATIONS

(71) Applicant: Adobe Inc., San Jose, CA (US)

(72) Inventors: Sourabh Gupta, Noida (IN); Jose Ignacio Echevarria Vallespi, South San Francisco, CA (US); Gourav Singhal, Delhi (IN); Mrinal Kumar Sharma, Hazaribagh (IN)

(73) Assignee: Adobe Inc., San Jose, CA (US)

( * ) Notice: Subject to any disclaimer, the term of this patent is extended or adjusted under 35 U.S.C. 154(b) by 154 days.

(21) Appl. No.: 17/938,581

(22) Filed: Oct. 6, 2022

(65) Prior Publication Data

US 2023/0031646 A1 Feb. 2, 2023

Related U.S. Application Data

(62) Division of application No. 17/152,633, filed on Jan. 19, 2021, now Pat. No. 11,509,819.

(51) Int. Cl.
*H04N 23/60* (2023.01)
*G06F 3/0485* (2022.01)
(Continued)

(52) U.S. Cl.
CPC ........... *H04N 23/64* (2023.01); *G06F 16/538* (2019.01); *G06V 40/103* (2022.01);
(Continued)

(58) Field of Classification Search
CPC ...... H04N 23/64; H04N 23/611; H04N 23/63; H04N 23/633; H04N 23/631; G06V 20/20; G06V 40/103; G06F 16/538; G06F 3/0485
(Continued)

(56) References Cited

U.S. PATENT DOCUMENTS 8,698,937 B2 4/2014 Jeong
9,049,360 B2* 6/2015 Jo .................... H04N 23/61
(Continued)

FOREIGN PATENT DOCUMENTS

CN 109660719 A 4/2019
CN 109743504 A 5/2019
CN 110868538 A 3/2020

OTHER PUBLICATIONS

FU , H., Han, X., Phan, a H.: Data-driven suggestions for portrait posing. In: SIGGRAPH Asia 2013 Technical Briefs. 2013. S. 1-4. doi: 10.1145/2542355.2542391.
(Continued)

*Primary Examiner* — Pritham D Prabhakher
(74) *Attorney, Agent, or Firm* — Keller Preece PLLC

(57) ABSTRACT

The present disclosure relates to systems, non-transitory computer-readable media, and methods for generating and providing pose guides that are tailored to a context of a camera viewfinder stream. In particular, in one or more embodiments, the disclosed systems determine a context of the camera viewfinder stream and provide sample pose images that correspond with the determined context. In response to a selection of a sample pose image, the disclosed systems generate and display a pose guide that is customized to the proportions of a subject depicted in the camera viewfinder stream. The disclosed systems further iteratively modify portions of the generated pose guide to indicate that the subject depicted in the camera viewfinder stream is coming into alignment with the generated pose guide. The disclosed systems automatically capture a digital image when the subject is in total alignment with the generated pose guide.

20 Claims, 20 Drawing Sheets

(51) Int. Cl.
  *G06F 16/538* (2019.01)
  *G06V 40/10* (2022.01)
  *H04N 23/63* (2023.01)
(52) U.S. Cl.
  CPC ......... *H04N 23/631* (2023.01); *H04N 23/633* (2023.01); *G06F 3/0485* (2013.01)
(58) Field of Classification Search
  USPC .................................................... 348/333.02
  See application file for complete search history.

(56) References Cited

U.S. PATENT DOCUMENTS

| | | | |
|---|---|---|---|
| 9,332,208 B2 * | 5/2016 | Hayashi | G03B 17/54 |
| 10,075,631 B2 * | 9/2018 | Iijima | H04N 23/66 |
| 10,091,414 B2 | 10/2018 | Chan et al. | |
| 10,116,859 B2 * | 10/2018 | Matsunaga | H04N 23/633 |
| 10,255,482 B2 | 4/2019 | Morgana et al. | |
| 10,360,440 B2 * | 7/2019 | Lee | G06V 30/142 |
| 10,574,881 B2 * | 2/2020 | Oleson | H04N 23/632 |
| 10,839,577 B2 * | 11/2020 | Horie | G06T 3/4053 |
| 10,924,660 B2 * | 2/2021 | Lusk | G06T 19/006 |
| 10,958,874 B2 | 3/2021 | Astarabadi et al. | |
| 10,986,265 B2 | 4/2021 | Yoo et al. | |
| 11,024,090 B2 | 6/2021 | Cragg et al. | |
| 11,087,514 B2 | 8/2021 | Shukla et al. | |
| 11,165,953 B1 | 11/2021 | Thorn et al. | |
| 11,676,200 B2 * | 6/2023 | Wade | G06Q 30/0643 705/27.2 |
| 2008/0297617 A1 | 12/2008 | Jeong | |
| 2010/0266206 A1 * | 10/2010 | Jo | H04N 23/611 382/190 |
| 2013/0033633 A1 | 2/2013 | Son | |
| 2013/0038759 A1 * | 2/2013 | Jo | H04N 23/56 348/240.99 |
| 2013/0047081 A1 * | 2/2013 | Long | G06F 3/04842 715/705 |
| 2013/0047082 A1 * | 2/2013 | Long | G06F 3/04817 715/708 |
| 2013/0117671 A1 * | 5/2013 | Long | G06F 3/0488 715/725 |
| 2015/0002633 A1 | 1/2015 | Hayashi et al. | |
| 2015/0271394 A1 * | 9/2015 | Iijima | H04N 23/66 348/211.99 |
| 2016/0006945 A1 * | 1/2016 | Furuhashi | H04N 23/633 348/239 |
| 2016/0105604 A1 | 4/2016 | Perez-Feliciano et al. | |
| 2016/0234432 A1 * | 8/2016 | Matsunaga | H04N 23/633 |
| 2017/0017834 A1 | 1/2017 | Sabitov et al. | |
| 2017/0061210 A1 | 3/2017 | Ollila | |
| 2017/0064214 A1 | 3/2017 | Zhang et al. | |
| 2017/0221244 A1 | 8/2017 | Hiraga et al. | |
| 2017/0243054 A1 * | 8/2017 | Lee | G06V 40/172 |
| 2017/0270348 A1 * | 9/2017 | Morgana | H04N 23/611 |
| 2017/0374280 A1 | 12/2017 | Chan et al. | |
| 2018/0247427 A1 | 8/2018 | Geiger et al. | |
| 2018/0295281 A1 | 10/2018 | Hao et al. | |
| 2018/0376072 A1 | 12/2018 | Kwon et al. | |
| 2019/0080498 A1 * | 3/2019 | Horie | G06T 3/4053 |
| 2019/0096112 A1 * | 3/2019 | Pao | G06T 17/00 |
| 2019/0253614 A1 * | 8/2019 | Oleson | H04N 23/62 |
| 2019/0306411 A1 * | 10/2019 | Lusk | G06T 7/70 |
| 2020/0074667 A1 | 3/2020 | Khandavalli et al. | |
| 2020/0090408 A1 | 3/2020 | Virkar et al. | |
| 2020/0358983 A1 | 11/2020 | Astarabadi et al. | |
| 2020/0410761 A1 | 12/2020 | Cragg et al. | |
| 2021/0185222 A1 * | 6/2021 | Zavesky | H04N 23/632 |
| 2021/0248669 A1 * | 8/2021 | Wade | G06F 3/016 |
| 2021/0375016 A1 * | 12/2021 | Voss | G06V 40/166 |

OTHER PUBLICATIONS

Y. Zhang, X. Sun, H. Yao, L. Qin and Q. Huang, "Aesthetic composition representation for portrait photographing recommendation," 2012 19th IEEE International Conference on Image Processing, Orlando, FL, 2012, pp. 2753-2756, doi: 10.1109/ICIP.2012.6467469.

Wang, Y. et al.; "Where2Stand: A Human Position Recommendation System for Souvenir Photography"; ACM Transactions on Intelligent Systems and Technology Oct. 2015 Article No. 9 https://doi.org/10.1145/2770879.

Y. S. Rawat and M. S. Kankanhalli, "ClickSmart: A Context-Aware Viewpoint Recommendation System for Mobile Photography," in IEEE Transactions on Circuits and Systems for Video Technology, vol. 27, No. 1, pp. 149-158, Jan. 2017, doi: 10.1109/TCSVT.2016.2555658.

Office Action as received in German application 10 2021 005 722.8 dated Jun. 13, 2022.

Combined Search and Examination Report as received in UK application GB2116553.5 dated Jul. 29, 2022.

U.S. Appl. No. 17/152,633 filed Jul. 26, 2022.

Office Action as received in Chinese application 202111265211.4 dated Aug. 16, 2024.

* cited by examiner

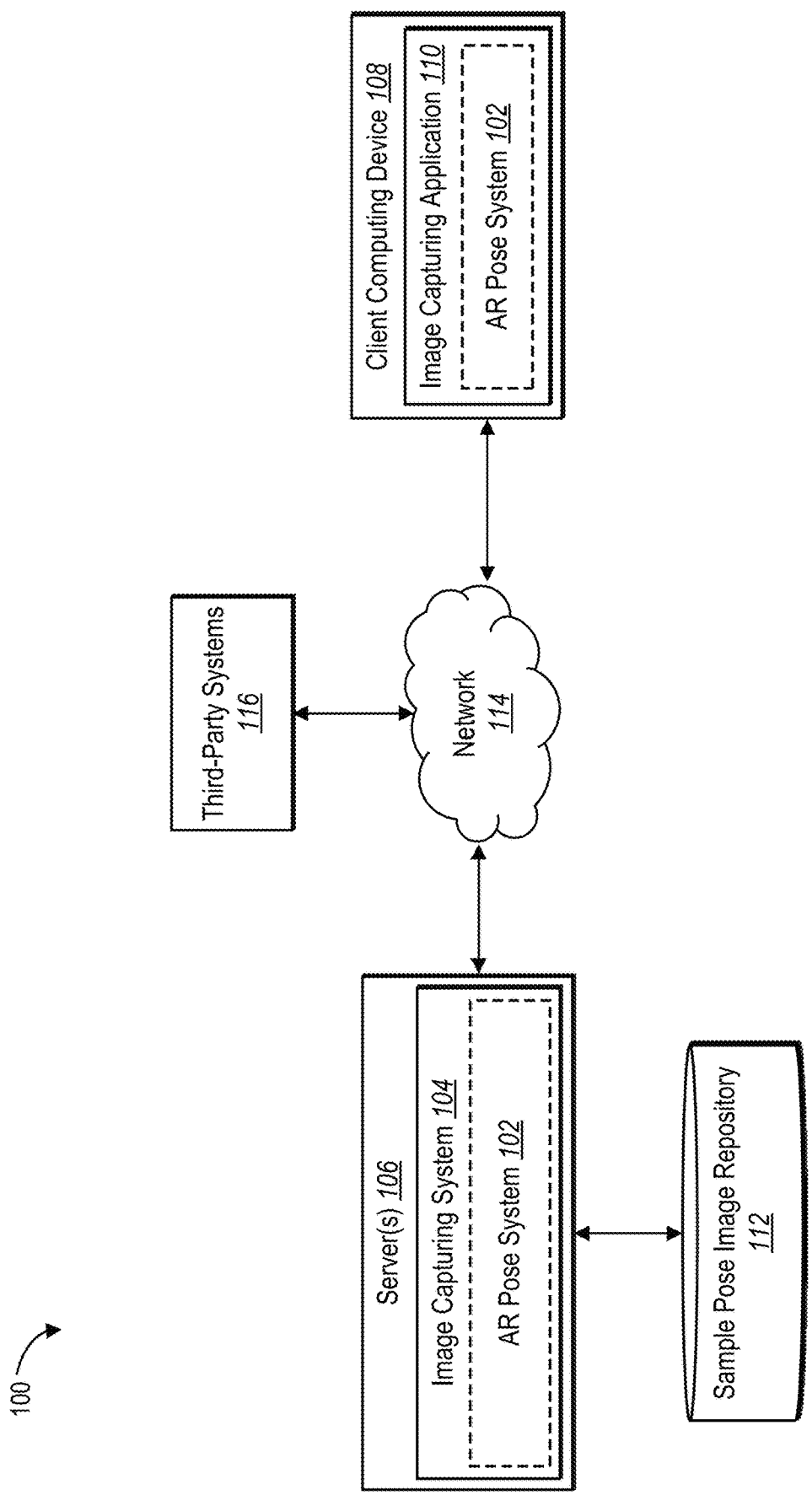

PROVIDING CONTEXTUAL AUGMENTED REALITY PHOTO POSE RECOMMENDATIONS

CROSS-REFERENCE TO RELATED APPLICATIONS

The present application is a divisional of U.S. application Ser. No. 17/152,633, filed on Jan. 19, 2021. The aforementioned application is hereby incorporated by reference in its entirety.

BACKGROUND

Recent years have seen significant improvements with regard to imaging systems. For example, conventional imaging systems provide vivid camera viewfinder displays and capture colorful and detailed digital images via mobile devices. Specifically, conventional imaging systems provide imaging experiences that include utilizing a mobile device camera viewfinder to position a camera of the mobile device, and then capturing a digital image in response to a user interaction with a shutter function of the mobile device.

Often, users want to imitate (or to instruct others to imitate) interesting and engaging poses that they have seen in professional photographs or other media. In order to do so, conventional imaging systems often require users to access web browsers and other applications on their mobile device to find professional images including poses for imitation. Following this, conventional imaging systems further require users to navigate between and interact with these web browsers and other applications and the conventional imaging system to view and imitate (or to instruct others to imitate) the displayed poses. As such, conventional imaging systems are particularly inefficient when operating in connection with a client computing device with a small screen—such as a smart phone or table, where interacting with and switching between multiple applications to find and imitate professional photographic poses are difficult.

Moreover, by forcing users to estimate and guess with regard to pose imitation between applications, conventional imaging systems give rise to various system-level inefficiencies. For example, in forcing users to switch back-and-forth between applications to imitate professional and engaging poses, conventional imaging systems cause the overuse and eventual waste of system resources associated with generating graphical displays, storing user selections, maintaining application data, and capturing digital images. Additionally, given the guess-work involved in attempting to imitate poses between applications, conventional imaging systems waste additional system resources in capturing and deleting digital images that fail to turn out the way the user desires.

Even when conventional imaging systems provide a level of in-application pose guidance, such conventional imaging systems are generally inflexible and inaccurate. For example, in order to provide a level of pose guidance, conventional imaging systems are limited to static, outline-based overlays. To illustrate, a conventional imaging system may provide pose guidance as a generic human-shaped pose outline that is overlaid on a camera viewfinder of a client computing device.

This level of pose guidance provided by conventional imaging systems is inflexible. For example, as discussed, conventional imaging systems provide one-size-fits all pose guidance that is untethered from the proportions, characteristics, and attributes of the person who is posing. Thus, conventionally provided pose guidance is too rigid to be tailored to the body of any particular poser.

Furthermore, this conventionally provided pose guidance is extremely inaccurate. For example, conventional imaging systems provide pose guidance that is non-specific with regard to a posing user's context and position within the camera viewfinder. Accordingly, conventional imaging systems often inaccurately capture digital images where the posing user is in a pose that is not the same as indicated by the pose guidance and/or the posing user is in an inappropriate pose relative to the context of posing user.

These along with additional problems and issues exist with regard to conventional imaging systems.

BRIEF SUMMARY

This disclosure describes one or more embodiments of systems, non-transitory computer-readable media, and methods that solve one or more of the foregoing or other problems in the art. In particular, the disclosed systems determine and provide sample pose images that are tailored to a context of a user's camera viewfinder stream. For example, the disclosed systems determine the context of the camera viewfinder stream based on objects, backgrounds, attire, and other characteristics depicted in the camera viewfinder stream. The disclosed systems then identify sample pose images that correspond with the determined context. The disclosed systems provide the identified sample pose images as selectable display elements overlaid on the camera viewfinder such that the user may select a particular sample pose image to imitate without having to switch to a different application.

In addition to providing contextually-tailored sample pose images via the camera viewfinder, the disclosed systems further generate and provide a pose guide based on a selected sample pose image. For example, the disclosed systems extract a subject body frame representing a subject (e.g., a human) depicted in the camera viewfinder stream. The disclosed systems further extract a reference body frame representing a human depicted in the selected sample pose image. To generate the pose guide, for example, the disclosed systems retarget the reference body frame based on the proportions of the subject body frame. The disclosed systems then overlay the retargeted reference body frame on the camera viewfinder by aligning the retargeted reference body frame to a landmark relative to the subject. As the subject moves body parts to align with the pose indicated by the retargeted reference body frame, the disclosed systems modify display characteristics of the retargeted reference body frame overlaid on the camera viewfinder to indicate the alignment. In response to determining a total alignment between the subject and the retargeted reference body frame, the disclosed systems optionally automatically capture a digital image from the camera viewfinder stream.

Additional features and advantages of one or more embodiments of the present disclosure are outlined in the description which follows, and in part will be obvious from the description, or may be learned by the practice of such example embodiments.

BRIEF DESCRIPTION OF THE DRAWINGS

The detailed description provides one or more embodiments with additional specificity and detail through the use of the accompanying drawings, as briefly described below.

FIG. 1 illustrates a diagram of an environment in which an AR pose system operates in accordance with one or more embodiments.

DETAILED DESCRIPTION

Figure 2B:
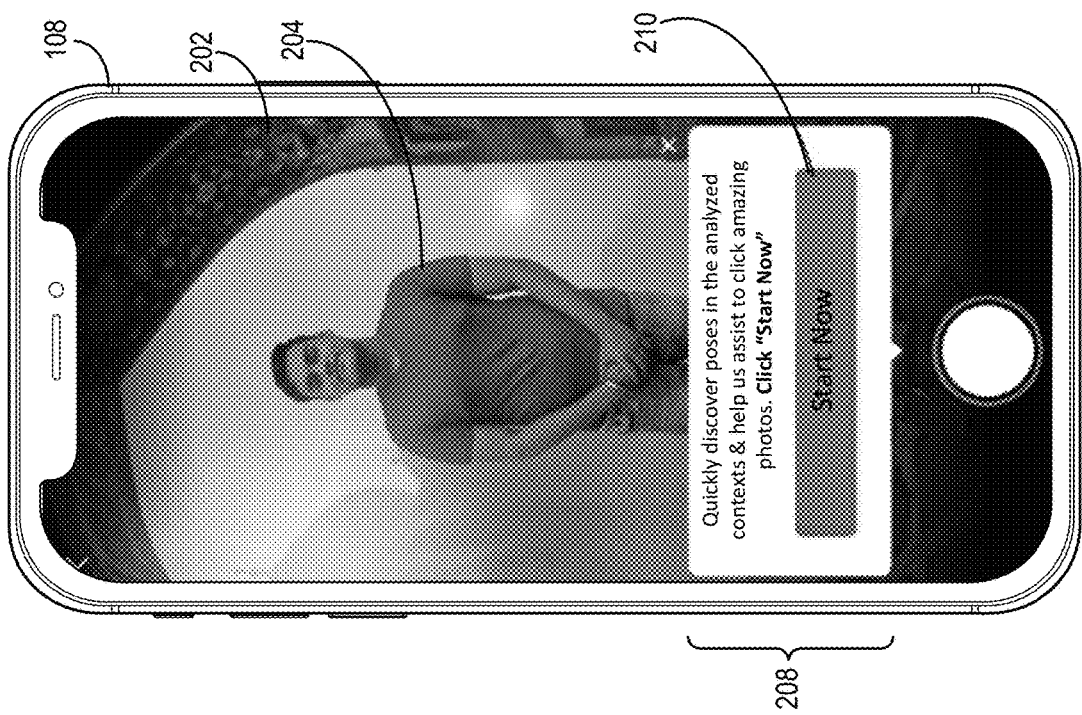
FIGS. 2A-2G illustrate the AR pose system providing sample pose images and an interactive pose guide via a camera viewfinder of the client computing device in accordance with one or more embodiments.

This disclosure describes one or more embodiments of an augmented reality (AR) pose system that provides interactive augmented reality pose guides via a camera viewfinder based on contextually relevant sample pose images. For example, the AR pose system determines a context associated with a camera viewfinder stream of a client computing device, and identifies a collection of sample pose images that corresponds with the determined context. In response to detecting a user selection of one of the sample pose images, the AR pose system generates an AR pose guide based on extracted body frames from both the camera viewfinder stream and the selected sample pose image. The AR pose system further aligns the AR pose guide with a subject in the camera viewfinder and iteratively determines an alignment between portions of AR pose guide and corresponding body parts of the subject in the camera viewfinder. In response to determining that all the AR pose guide portions and corresponding body parts are in alignment, the AR pose system captures a digital image from the camera viewfinder stream.

In more detail, the AR pose system optionally determines a context associated with the camera viewfinder stream of the client computing device based on an analysis of a digital image from the camera viewfinder stream. For example, the AR pose system extracts a digital image (e.g., an image frame) from the camera viewfinder stream of the client computing device. The AR pose system further analyzes the digital image to determine a subject (e.g., a human) within the digital image. The AR pose system performs additional analysis of the digital image to determine object tags, gender tags, and attire tags associated with the digital image. In one or more embodiments, the AR pose system determines a context of the digital image based on the determined tags in association with the identified subject.

In response to determining the context of the digital image from the camera viewfinder stream of the client computing device, the AR pose system generates a collection of sample pose images that correspond to the determined context. For example, in one embodiment, the AR pose system generates the collection by querying one or more sample pose image repositories and search engines with a search query based on the one or more contextual tags associated with the digital image. To illustrate, in one or more embodiments, the AR pose system generates the search query including one or more of the contextual tags associated with the subject depicted in the digital image, the scene depicted in the digital image, and other objects depicted in the digital image. The AR pose system further utilizes the generated search query in connection with one or more sample pose image repositories including but not limited to: a local sample pose image repository, general search engines, and other third-party applications.

In one or more embodiments, the AR pose system optimizes the limited amount of display space common to client computing devices by providing a diverse subset of the collection of sample pose images. For example, in one embodiment, the AR pose system utilizes one or more clustering techniques to group similar sample pose images together from the identified collection of sample pose images. The AR pose system further provides the diverse subset of sample pose images by identifying and providing a sample pose image from each group or cluster.

In one or more embodiments, the AR pose system provides the diverse subset of the collection of sample pose images via the camera viewfinder of the client computing device. For example, the AR pose system generates an interactive overlay including the diverse subset of sample pose images. The AR pose system further positions the interactive overlay on the camera viewfinder of the client computing device. In one or more alternative implementations, the AR pose system retrieves a plurality of commonly selected pose images, determines a plurality of popular pose images, or otherwise determines a collection of pose images to provide without determining the context of the camera viewfinder.

In response to a detected selection of a sample pose image from the interactive overlay, the AR pose system generates and provides an AR pose guide via the camera viewfinder. For example, in at least one embodiment, the AR pose system generates an AR pose guide that indicates how a subject depicted in the camera viewfinder stream should position one or more body parts in order to mimic the pose depicted in the selected sample pose image. In one or more embodiments, the AR pose system generates the AR pose guide by extracting a subject body frame representing a subject from the camera viewfinder stream of the client computing device. The AR pose system then extracts a reference body frame representing a pose from the selected sample pose image. Finally, the AR pose system generates the AR pose guide by retargeting the reference body frame based on the proportions of the subject body frame.

The AR pose system provides the retargeted reference body frame as the AR pose guide via the camera viewfinder of the client computing device. In one or more embodiments, for example, the AR pose system provides the AR pose guide by generating a visualization of the retargeted reference body frame. The AR pose system then anchors the visualization at least one predetermined point of the visualization to at least one landmark of the subject depicted in the camera viewfinder stream. Thus, the AR pose system provides the AR pose guide via the camera viewfinder such that the user of the client computing device is able to see how the body of the subject aligns with the pose indicated by the AR pose guide.

The AR pose system iteratively determines an alignment between portions of the retargeted reference body frame and portions of the subject depicted in the camera viewfinder stream. For example, in at least embodiment, the AR pose system aligns both the subject body frame and the retargeted reference body frame to one or more regions (e.g., a hip region, a chest region) of the subject depicted in the camera viewfinder. The AR pose system then iteratively determines that one or more segments of the subject body frame are aligned with corresponding segments of the retargeted reference body frame.

In one or more embodiments, for each determined segment alignment, the AR pose system modifies a display characteristic (e.g., a color, a line width) of the aligned segment of the retargeted reference body frame. Thus, the AR pose system provides easy visual cues to the user of the client computing device indicating whether the subject in the camera viewfinder is correctly mimicking the pose from the selected sample pose image. In response to determining that all of the segments of the subject body frame are aligned with corresponding segments of the retargeted reference body frame, the AR pose system captures a digital image from the camera viewfinder stream. For example, the AR pose system optionally automatically captures a digital image in response to determining alignment between the pose guide and the subject. In other embodiments, the AR pose system captures a digital image in response to selection of a shutter button selection by a user upon the AR pose system determining alignment between the pose guide and the subject While the embodiments discussed herein focus on a single subject in the camera viewfinder stream and a single subject in a selected sample pose image, the AR pose system is not so limited and in other embodiments generates and provides pose guides for multiple subjects depicted in a camera viewfinder stream. For example, the AR pose system extracts body frames for multiple subjects depicted in the camera viewfinder stream. The AR pose system further extracts body frames for multiple posed subjects depicted in a selected sample pose image. The AR pose system then retargets and anchors pose guides to each subject depicted in the camera viewfinder stream and iteratively determine alignments between the pose guides and the multiple subjects.

As mentioned above, the AR pose system provides many advantages and benefits over conventional imaging systems. For example, rather than requiring users to access and switch between multiple applications in order to find sample pose images, the AR pose system provides sample pose images in an interactive overlay positioned on the camera viewfinder of a client computing device. As such, the AR pose system provides an efficient, single-interface approach for providing pose guidance in connection with a camera viewfinder.

Additionally, the AR pose system overcomes and improves the various system-level inefficiencies common to conventional imaging systems. To illustrate, by avoiding the application and interface switching common to conventional imaging system, the AR pose system efficiently utilizes system resources to generate a single interactive overlay including sample pose images and positioning that overlay on a camera viewfinder of a client computing device. Thus, the AR pose system avoids the use and eventual waste of system resources associated with generating, maintaining, and otherwise persisting additional user interfaces and applications.

Moreover, the AR pose system further improves the efficiency of conventional imaging systems by providing sample pose images that are tailored to the context of the scene depicted in the camera viewfinder stream. For example, where conventional imaging systems fail to provide specific pose guidance, the AR pose system identifies and provides sample pose images that are targeted to the subject and scene depicted in the camera viewfinder stream. Thus, the AR pose system avoids the waste of systems resources involved in multiple user searches for sample pose images that are specific to the subject and scene depicted in the camera viewfinder stream.

The tailored pose guidance approach provided by the AR pose system is also flexible and accurate. For example, where some conventional imaging systems provide generic, outline-based overlays in an attempt to assist users in mimicking various poses, the AR pose system generates and provides a specific reference body frame that is tailored to the proportions of the subject depicted in the camera viewfinder stream. Thus, the AR pose system provides a pose guide that is specific to the body of the subject. Moreover, the AR pose system anchors the pose guide to the subject within the camera viewfinder such that the pose guide moves with the subject should the subject move within the camera viewfinder stream.

As illustrated by the foregoing discussion, the present disclosure utilizes a variety of terms to describe features and advantages of the disclosed AR pose system. Additional detail is now provided regarding the meaning of such terms. For example, as used herein, the term "digital image" refers to a collection of digital information that represents an image. More specifically, a digital image is composed of pixels, each including a numeric representation of a color and/or gray-level. Pixels are arranged in a digital image in two dimensions, where each pixel has spatial coordinates including an x-value and a y-value. In at least one embodiment, a "target digital image" refers to a digital image to which an edit could or will be applied. In one or more embodiments, a digital image is stored as a file (e.g., a ".jpeg" file, a ".tiff" file, a ".bmp" file, a ".pdf" file).

As used herein, the term "pose" refers to the configuration of a subject. In particular, a pose includes an arrangement of joints and/or segments connecting joints (e.g., of a visible figure). In some embodiments, a pose includes a visible depiction of joints and segments, while in other cases, a pose includes a computerized representation of joint locations and/or segment locations. In certain cases, a pose includes an abstract representation of joint locations and/or segment locations using vectors or other feature (e.g., deep feature) representations in a pose feature space or a pose prior space.

Relatedly, a "joint" refers to the joining of an endpoints of segments of a depicted human figure or a virtual mannequin. For instance, a joint refers to a location where two or more segments connect. In some embodiments, a joint includes a location where segments rotate, pivot, or otherwise move in relation to one another. In some cases, a joint includes a computerized or abstract vector representation of a location corresponding to a joint of depicted human figure or a virtual mannequin.

Along these lines, a "segment" refers to a representation or depiction of a length or portion of a human figure or a virtual mannequin. In some embodiments, a segment refers to a line or other connector between joints of a depicted human figure or a virtual mannequin. For example, a segment represents an upper arm between a shoulder joint and an elbow joint, a forearm between an elbow joint and a wrist joint, or an upper leg between a hip joint and a knee joint. In some cases, a segment includes a computerized or abstract vector representation of a line or connecting component between two joint locations of a depicted human figure or a virtual mannequin.

As used herein, a "subject" refers to a likeness, a depiction, or a portrayal of a human or humanoid shape within a digital image. For example, a subject includes a captured depiction of an actual person within a digital image, a drawing of a human shape in a digital image, a cartoon portrayal of a human character in a digital image, or some other humanoid shape in a digital image such as a human-shaped machine, creature, stick-figure, or other resemblance. In some cases, a subject includes one or more arms, one or more legs, a torso, and a head. Although many example embodiments described herein include human figures, the pose system is not so limited and in other embodiments the pose search system operates with regard to other figures such as animals, animated characters, and so forth.

As used herein, a "sample pose image" refers to a digital image portraying one or more subjects in a pose. For example, the AR pose system determines and provides one or more sample pose images including poses that are contextually relevant to a subject portrayed in a camera viewfinder of a client computing device. In one or more embodiments, a sample pose image further includes a background, additional objects, attire, and/or metadata describing the contents of the sample pose image. In at least one embodiment, the AR pose system accesses sample pose images from private image repositories, public image repositories, additional applications, and/or search engines.

As used herein, a "body frame" refers to a representation of joints and segments of a subject. For example, a body frame representing a human subject includes joint representations associated with the subject's hips, knees, shoulders, elbows, and so forth. The body frame further includes segment representations associated with upper and lower arms, upper and lower legs, and so forth. In at least one embodiment, a body frame further includes a circular representation of the subject's head. As used herein, a "reference body frame" refers to a body frame representing a subject depicted in a sample pose image. As used herein, a "subject body frame" refers to a body frame representing a subject depicted in the camera viewfinder of the client computing device.

The term "neural network" refers to a machine learning model that is trained and/or tuned based on inputs to determine classifications or approximate unknown functions. For example, the term neural network includes a model of interconnected artificial neurons (e.g., organized in layers) that communicate and learn to approximate complex functions and generate outputs based on a plurality of inputs provided to the neural network. In some cases, a neural network refers to an algorithm (or set of algorithms) that implements deep learning techniques to model high-level abstractions in data. For example, a neural network includes a convolutional neural network, a recurrent neural network (e.g., an LSTM neural network), a graph neural network, or a generative neural network.

As used herein, the term "pose neural network" refers to a neural network trained or tuned to identify poses. For example, a pose neural network determines a pose of a digital image by processing the digital image to identify locations and arrangements of joints and segments of a human figures portrayed in the digital image. As another example, the pose neural network determines a pose of a virtual mannequin by processing the virtual mannequin to identify locations of joints and segments of the virtual mannequin. Additional detail regarding architecture of a pose neural network is provided in greater detail below.

Additional detail regarding the AR pose system will now be provided with reference to the figures. For example, FIG. 1 illustrates a schematic diagram of an example system environment for implementing an AR pose system 102 in accordance with one or more embodiments. An overview of the AR pose system 102 is described in relation to FIG. 1. Thereafter, a more detailed description of the components and processes of the AR pose system 102 is provided in relation to the subsequent figures.

As shown, the environment includes server(s) 106, a client computing device 108, a sample pose image repository 112, one or more third-party system(s) 116, and a network 114. Each of the components of the environment communicate via the network 114, and the network 114 is any suitable network over which computing devices communicate. Example networks are discussed in more detail below in relation to FIG. 10.

As mentioned, the environment includes a client computing device 108. The client computing device 108 comprises one of a variety of computing devices, including a smartphone, a tablet, a smart television, a desktop computer, a laptop computer, a virtual reality device, an augmented reality device, or another computing device as described in relation to FIG. 10. Although FIG. 1 illustrates a single client computing device 108, in some embodiments the environment includes multiple different client devices, each associated with a different user (e.g., a digital image editor). The client computing device 108 communicates with the server(s) 106 via the network 114. For example, the client computing device 108 receives user input from a user interacting with the client computing device 108 (e.g., via the image capturing application 110) to, for instance, select a sample pose image. The AR pose system 102 receives information or instructions to generate a collection of sample pose images from one or more of the sample pose image repositories 112 or the third-party system(s) 116.

As shown, the client computing device 108 includes an image capturing application 110. In particular, the image capturing application 110 is a web application, a native application installed on the client computing device 108 (e.g., a mobile application, a desktop application, etc.), or a cloud-based application where all or part of the functionality is performed by the server(s) 106. The image capturing application 110 presents or displays information to a user, including a camera viewfinder (including a camera viewfinder stream), an interactive overlay including one or more sample pose images, a pose guide including a retargeted reference body frame, and/or additional information associated with a determined context of the camera viewfinder stream. A user interacts with the image capturing application 110 to provide user input to perform operations as mentioned above, such as selecting a sample pose image.

As illustrated in FIG. 1, the environment includes the server(s) 106. The server(s) 106 generates, tracks, stores, processes, receives, and transmits electronic data, such as digital images, search queries, sample pose images, and pose guides. For example, the server(s) 106 receives data from the client computing device 108 in the form of a digital image from a camera viewfinder stream to identify sample pose images corresponding to a context of the digital image. In addition, the server(s) 106 transmits data to the client computing device 108 to provide sample pose images corresponding to a context of the camera viewfinder stream and one or more pose guides for display via the camera viewfinder. Indeed, the server(s) 106 communicates with the client computing device 108 to transmit and/or receive data via the network 114. In some embodiments, the server(s) 106 comprises a distributed server where the server(s) 106 includes a number of server devices distributed across the network 114 and located in different physical locations. The server(s) 106 comprises a content server, an application server, a communication server, a web-hosting server, a multidimensional server, or a machine learning server.

The image capturing system 104 communicates with the client computing device 108 to perform various functions associated with the image capturing application 110 such as storing and managing a repository of digital images, determining or accessing labels for digital content depicted within the digital images, and retrieving digital images based on one or more search queries. For example, the AR pose system 102 communicates with the sample pose image repository to access a sample pose image. Indeed, as further shown in FIG. 1, the environment includes the sample pose image repository 112. In particular, the sample pose image repository 112 stores information such as a repository of digital images depicting subjects in various poses within various scenes, as well as various neural networks including a pose neural network. The AR pose system 102 further communicates with the third-party system(s) 116 to access additional sample pose images.

As shown in FIG. 1, illustrates a particular arrangement of the environment, in some embodiments, the environment has a different arrangement of components and/or may have a different number or set of components altogether. For instance, FIG. 1 shows that the client computing device 108, the server(s) 106, or both can implement the AR pose system 102. In some embodiments, the AR pose system 102 is implemented by (e.g., located entirely on) the client computing device 108. In which implementations, the client computing device 108 can download the AR pose system 102 from the server(s) 106. Alternatively, the AR pose system 102 is implemented by the server(s) 106 and the client computing device 108 accesses the AR pose system 102 through web-hosted application or website. Still further, the AR pose system 102 is implemented on both the client computing device 108 and the server(s) 106 and some functions are performed on the client computing device 108 and others on the server(s) 106. In addition, in one or more embodiments, the client computing device 108 communicates directly with the AR pose system 102, bypassing the network 114. Further, in some embodiments, the sample pose image repository 112 is located external to the server(s) 106 (e.g., in communication via the network 114) or located on the server(s) 106 and/or on the client computing device 108.

In one or more embodiments, the AR pose system 102 receives a digital image from a camera viewfinder stream of the client computing device 108 and utilizes various image analysis techniques to determine a context of the digital image. The AR pose system 102 then identifies and provides at least one sample pose image that corresponds with the determined context of the digital image. In response to a detected selection of the provided sample pose image, the AR pose system 102 generates and provides a pose guide such that a user of the client computing device 108 is able to easily see how the body of the subject depicted in the camera viewfinder stream aligns with a pose represented in the selected sample pose image. The AR pose system 102 iteratively determines that various body parts of the subject are in alignment with the pose guide, and updates one or more display characteristics of the pose guide to indicate to the user of the client computing device 108 that the subject is correctly mimicking the pose depicted in the selected sample pose image. In response to determining that the subject depicted in the camera viewfinder stream is in alignment with the pose guide overlaid on the camera viewfinder, the AR pose system 102 automatically captures a digital image from the camera viewfinder stream without any additional input from the user of the client computing device 108. In alternative implementations, the AR pose system 102 captures a digital image in response to a user selection of a shutter button.

Figure 2A:
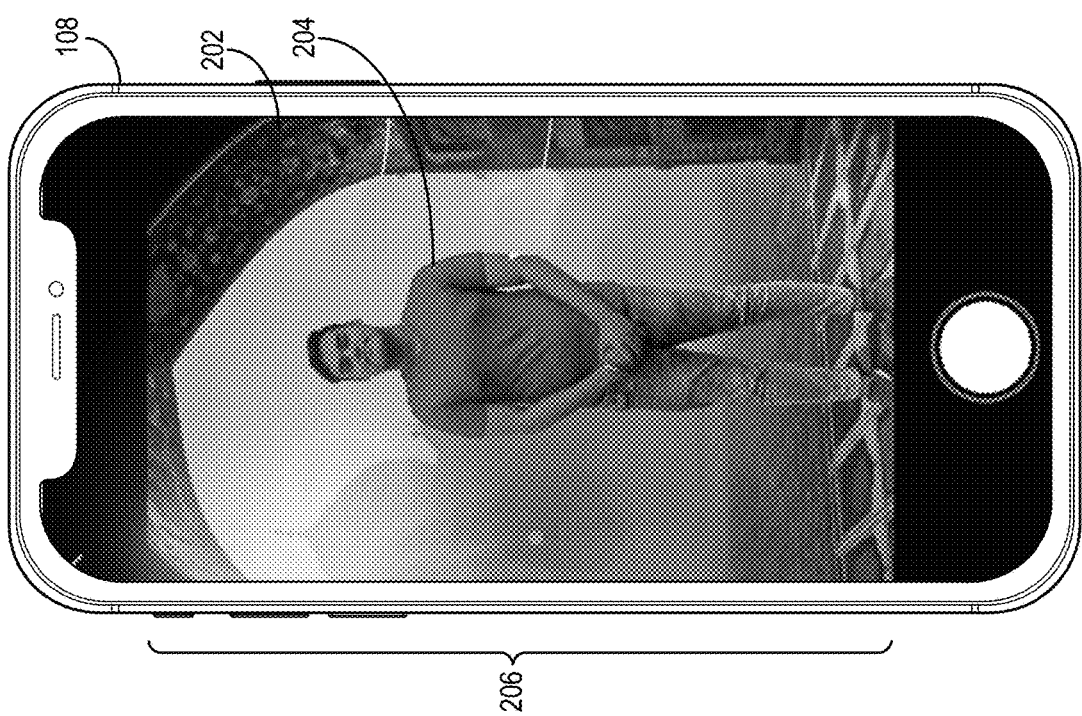

FIGS. 2A-2G illustrate the AR pose system 102 providing sample pose images and an interactive pose guide via a camera viewfinder of the client computing device 108. For example, FIG. 2A shows a camera viewfinder 202 of the client computing device 108. In one or more embodiments, the camera viewfinder 202 displays a camera viewfinder stream of digital images or image frames depicting a subject 204 within a scene 206. As further shown in FIG. 2A, the subject 204 includes attire (e.g., clothing, jewelry, accessories), a gender, and other attributes. Furthermore, the scene 206 includes buildings, plants, backgrounds, vehicles, a sky region, other subjects, animals, and so forth.

FIG. 2B shows the AR pose system 102 providing an entry point option 210 associated with the AR pose system 102 in connection with the camera viewfinder stream of the camera viewfinder 202. In one or more embodiments, the AR pose system 102 provides a message box 208 including the entry point option 210 in response to detecting an initialization of the image capturing application 110 on the client computing device 108. Additionally or alternatively, the AR pose system 102 provides the message box 208 including the entry point option 210 in response to determining that the camera viewfinder stream in the camera viewfinder 202 depicts: one or more subjects, one or more subjects posing (e.g., not moving for more than a threshold amount of time), and/or a scene including at least one subject (e.g., a human in front of a background). For example, the AR pose system 102 makes any of these determinations utilizing one or more neural networks. Additionally or alternatively, the AR pose system 102 provides the message box 208 including the entry point option 210 in response to determining that the subject 204 is posing for a photo. For example, the AR pose system 102 optionally provides the message box 208 in response to determining that the subject 204 has not moved within the camera viewfinder 202 for a threshold amount of time.

In response to a detected selection of the entry point option 210, the AR pose system 102 determines a context of the camera viewfinder stream. For example, and as will be discussed in greater detail with regard to FIG. 3A, the AR pose system 102 utilizes one or more machine learning models, neural networks, and other algorithms to generate various tags or identifiers associated with a digital image from the camera viewfinder stream of the client computing device 108. To illustrate, the AR pose system 102 utilizes an object detector, a subject detector, and other detectors to generate one or more object tags, gender tags, attire tags, and/or other tags associated with the digital image. For instance, the AR pose system 102 utilizes these detectors to generate tags indicating contents of the scene depicted in the digital image (e.g., buildings, plants, vehicles, animals, cars), and attributes of the subject within the scene (e.g., clothing type, hair type, facial hair). In one or more embodiments, the AR pose system 102 determines a context associated with the digital image based on the one or more determined tags.

The AR pose system 102 further provides a collection of sample pose images corresponding to the determined context of the digital image. For example, in one embodiment, the AR pose system 102 generates a search query based on the determined context and utilizes the search query in connection with one or more of the sample pose image repository 112 and the third-party system(s) 116 to generate the collection of sample pose images. To illustrate, in response to determining that the context of the digital image is a bride and groom at a wedding, the AR pose system 102 generates the collection of sample pose images including images of other brides and grooms in wedding attire in a range of poses (e.g., including professional models, popular images, celebrities).

In at least one embodiment, the AR pose system 102 further identifies a diverse subset of the collection of sample pose images. For example, the AR pose system 102 avoids providing multiple sample pose images that depict the same or similar poses. Accordingly, in one or more embodiments, the AR pose system 102 clusters the sample pose images in the collection of sample pose images based on similarity. The AR pose system 102 further identifies the diverse subject of sample pose images by selecting a sample pose image from each of the clusters. In at least one embodiment, the AR pose system 102 utilizes k-means clustering to identify the diverse subject of the collection of sample pose images.

Figure 2D:
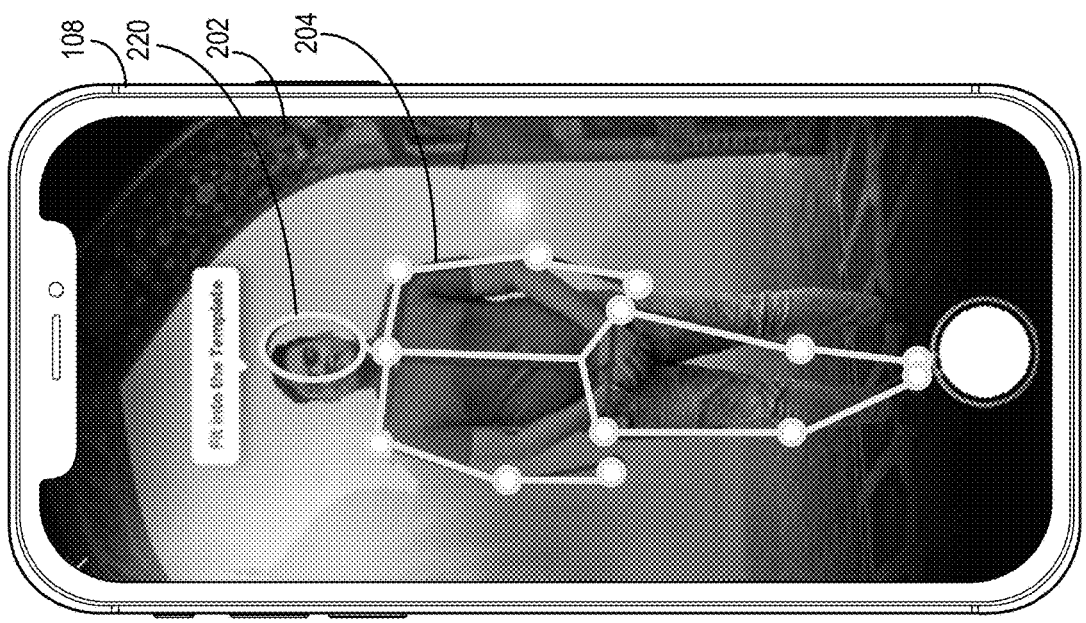
Figure 2C:
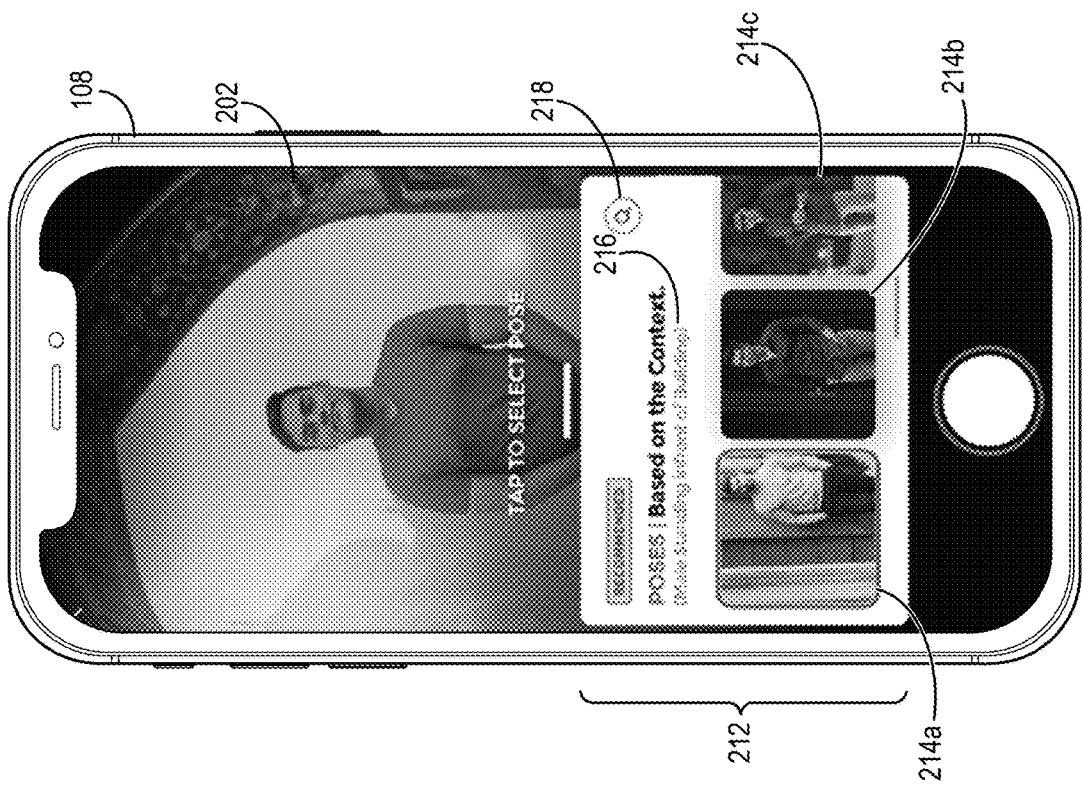

As shown in FIG. 2C, the AR pose system 102 generates an interactive overlay 212 including the diverse subset of sample pose images including sample pose images 214a, 214b, and 214c. In one or more embodiments, the AR pose system 102 generates the interactive overlay 212 including a top threshold number of sample pose images 214a-214c. Additionally or alternatively, the AR pose system 102 generates the interactive overlay 212 with the sample pose images 214a-214c in a horizontally slidable portion such that the AR pose system 102 displays additional sample pose images in response to a detected horizontal slide tough gesture.

As further shown in FIG. 2C, the AR pose system 102 positions the interactive overlay 212 on the camera viewfinder 202. For example, the AR pose system 102 positions the interactive overlay 212 over a lower portion (e.g., a horizontal lower half, a horizontal lower third) of the camera viewfinder 202 such that the majority of the camera viewfinder 202 is unobstructed. In alternative embodiments, the AR pose system 102 positions the interactive overlay 212 over a vertical portion (e.g., a vertical half), or an upper portion of the camera viewfinder 202. In one alternative embodiment, the AR pose system 102 selectively positions the interactive overlay 212 based on the contents of the camera viewfinder stream. For example, in response to determining that a subject is in a lower third of the camera viewfinder stream, the AR pose system 102 positions the interactive overlay 212 over an upper third of the camera viewfinder.

As further shown in FIG. 2C, in at least one embodiment, the AR pose system 102 generates the interactive overlay 212 including an indication 216 of the context of the digital image. For example, the AR pose system 102 provides the indication of the context (e.g., "Male Standing In Front of Building") including one or more of the determined object and other tags associated with the digital image taken from the camera viewfinder stream.

Additionally, as shown in FIG. 2C, the AR pose system 102 provides a search button 218 within the interactive overlay 212. In one or more embodiments, in response to a detected selection of the search button 218, the AR pose system 102 provides a search interface wherein a user of the client computing device 108 enters a search query for additional sample pose images. Furthermore, utilizing the user-provided search query, the AR pose system 102 identifies additional sample pose images (e.g., from the sample pose image repository 112 and/or the third-party system(s) 116). In at least one embodiment, the AR pose system 102 displays the additionally identified sample pose images by expanding the interactive overlay 212. Alternatively, the AR pose system 102 generates and provides an additional user interface including the additionally identified sample pose images, and transitions display focus away from the camera viewfinder 202 to the additional user interface.

In one or more embodiments, the AR pose system 102 generates and provides a pose guide corresponding to a selected sample pose image. For example, in response to a detected selection of the sample pose image 214a, the AR pose system 102 generates and provides a pose guide 220, as shown in FIG. 2D. In at least one embodiment, and as will be discussed in greater detail below with regard to FIGS. 4A-4F, the AR pose system 102 generates the pose guide 220 by extracting a subject body frame from the digital image taken from the camera viewfinder stream that represents the proportions of the subject 204. The AR pose system 102 further extracts a reference body frame from the selected sample pose image 214a that represents proportions and a pose of a figure in the selected sample pose image 214a. The AR pose system 102 further generates the pose guide 220 by retargeting the reference body frame based on the proportions of the subject body frame. As shown in FIG. 2D, the resulting pose guide 220 retains the pose shown in the selected sample pose image 214a, but also has the proportions of the subject 204.

The AR pose system 102 aligns the pose guide 220 to the subject 204 by overlaying the pose guide 220 based on one or more landmarks of the subject 204. For example, the AR pose system 102 anchors the pose guide 220 to at least one landmark of the subject 204 such as a hip region of the subject 204. With the pose guide 220 thus anchored, the AR pose system 102 maintains the positioning of the pose guide 220 relative to the subject 204 even when the subject 204 moves within the camera viewfinder 202. Moreover, the AR pose system 102 anchors the pose guide 220 to additional regions of the subject 204, such as a chest region of the subject 204. With this additional anchoring, the AR pose system 102 maintains the position for the pose guide 220 relative to the subject 204 even when the subject 204 rotates toward or away from the client computing device 108.

Figure 2F:
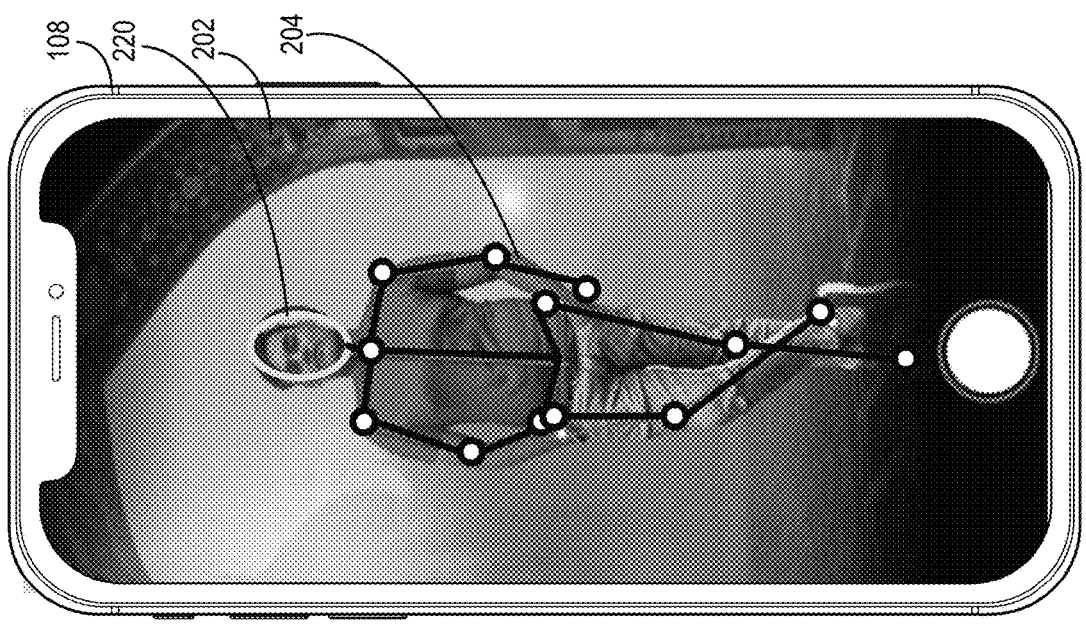
Figure 2E:
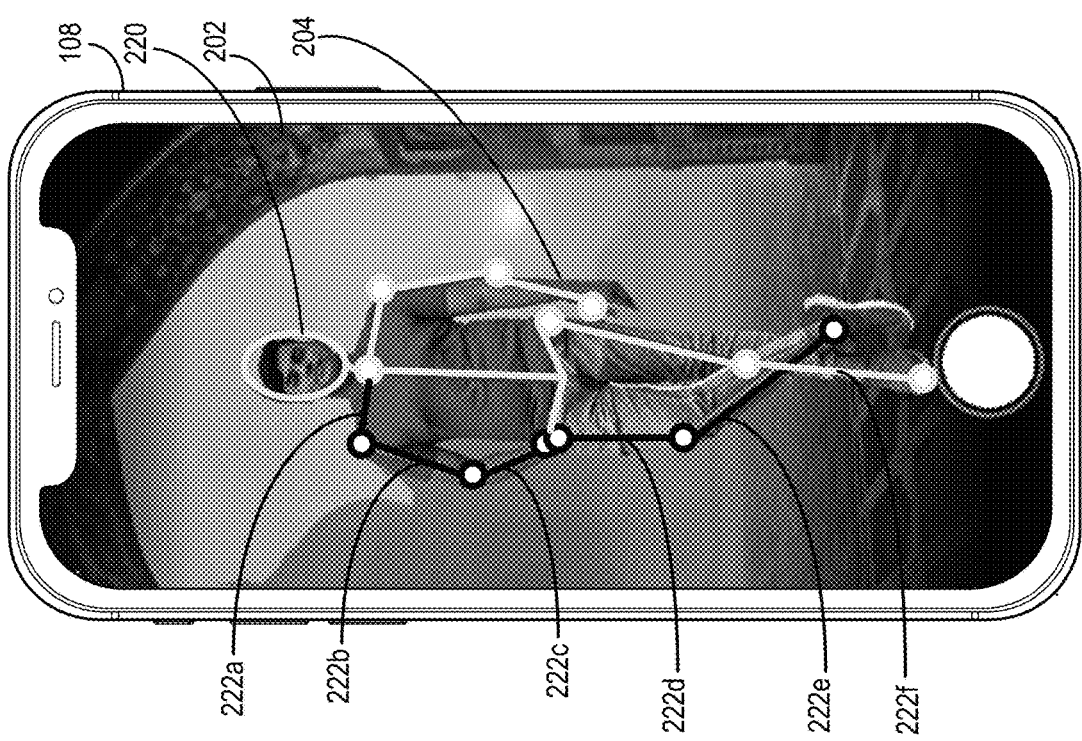

As further shown in FIG. 2E, the AR pose system 102 iteratively determines an alignment between portions of the pose guide 220 and portions of the subject depicted in the camera viewfinder 202. For example, in response to determining an alignment, the AR pose system 102 modifies one or more display characteristics of the aligned portion of the pose guide 220. To illustrate, as shown in FIG. 2E, in response to determining that the segments 222a, 222b, 222c, 222d, 222e, and 222f of the pose guide 220 are aligned with corresponding portions of the subject 204, the AR pose system 102 modifies a display color of the segments 222a-222f of the pose guide 220. By iteratively modifying the display characteristics of the segments of the pose guide 220, the AR pose system 102 provides effective guidance to the user of the client computing device 108 in positioning the subject 204 into the pose portrayed by the selected sample pose image 214a.

In one or more embodiments, the AR pose system 102 continues to iteratively determine alignments between the pose guide 220 and the subject 204. For example, as shown in FIG. 2F, the AR pose system 102 has modified a display color of additional segments of the pose guide 220 to indicate that the subject 204 has moved corresponding body portions to align with the pose guide 220. In at least one embodiment, the AR pose system 102 further modifies a display characteristic to indicate that a body portion of the subject 204 is no longer in alignment with the corresponding segment of the pose guide 220. For example, the AR pose system 102 changes a color of the segment of the pose guide 220 back to an original color to indicate that the corresponding body portion has fallen out of alignment.

Figure 2G:
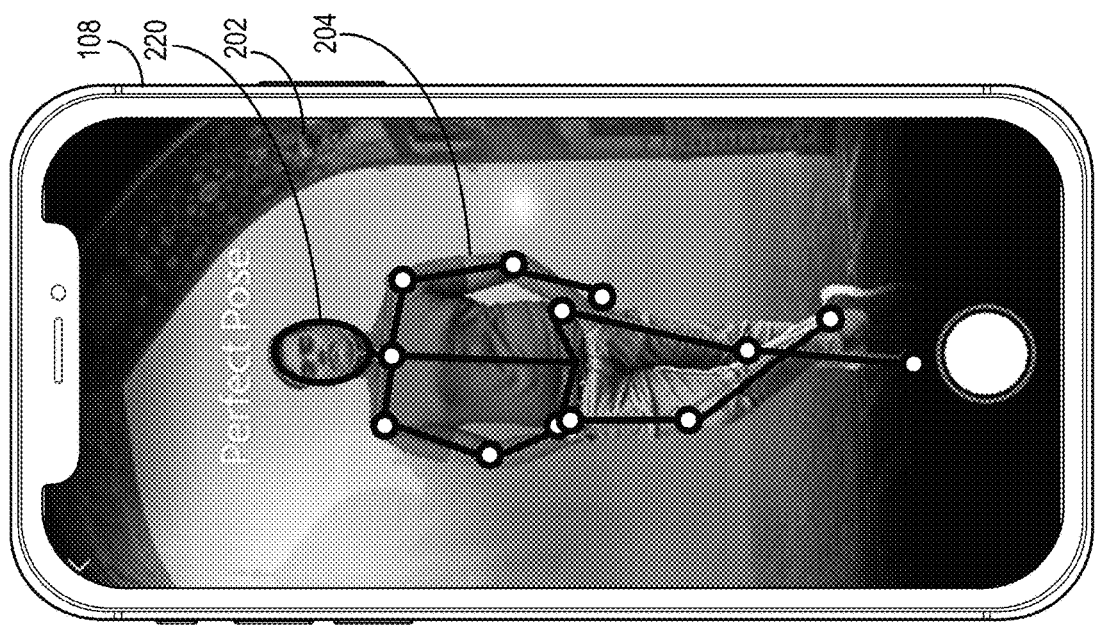

As shown in FIG. 2G, and in response to determining that all of the portions of the pose guide 220 are aligned with corresponding portions of the subject 204, the AR pose system 102 automatically captures a digital image from the camera viewfinder stream shown in the camera viewfinder 202 of the client computing device 108. Additionally, or alternatively, the AR pose system 102 automatically captures the digital image in response to determining that all of the portions of the pose guide 220 are aligned with corresponding portions of the subject 204 for a threshold amount of time (e.g., 2 seconds). Additionally, or alternatively, the AR pose system 102 automatically captures the digital image in response to determining that a predetermined number or percentage of portions of the pose guide 220 are aligned with a corresponding number or percentage of portions of the subject 204. In other embodiments, the AR pose system 102 captures the digital image in response to user selection of the shutter button.

In one or more embodiments, the AR pose system 102 saves the automatically captured digital image in the local storage on the client computing device 108. Additionally, or alternatively, the AR pose system 102 saves the automatically captured digital image in the sample pose image repository 112, so that the AR pose system 102 is able to use the automatically captured digital image as a sample pose image for the same or additional users of the AR pose system 102. Additionally, or alternatively, the AR pose system 102 further automatically uploads the automatically captured digital image to one or more social media accounts associated with the user of the client computing device 108.

Figure 3A:
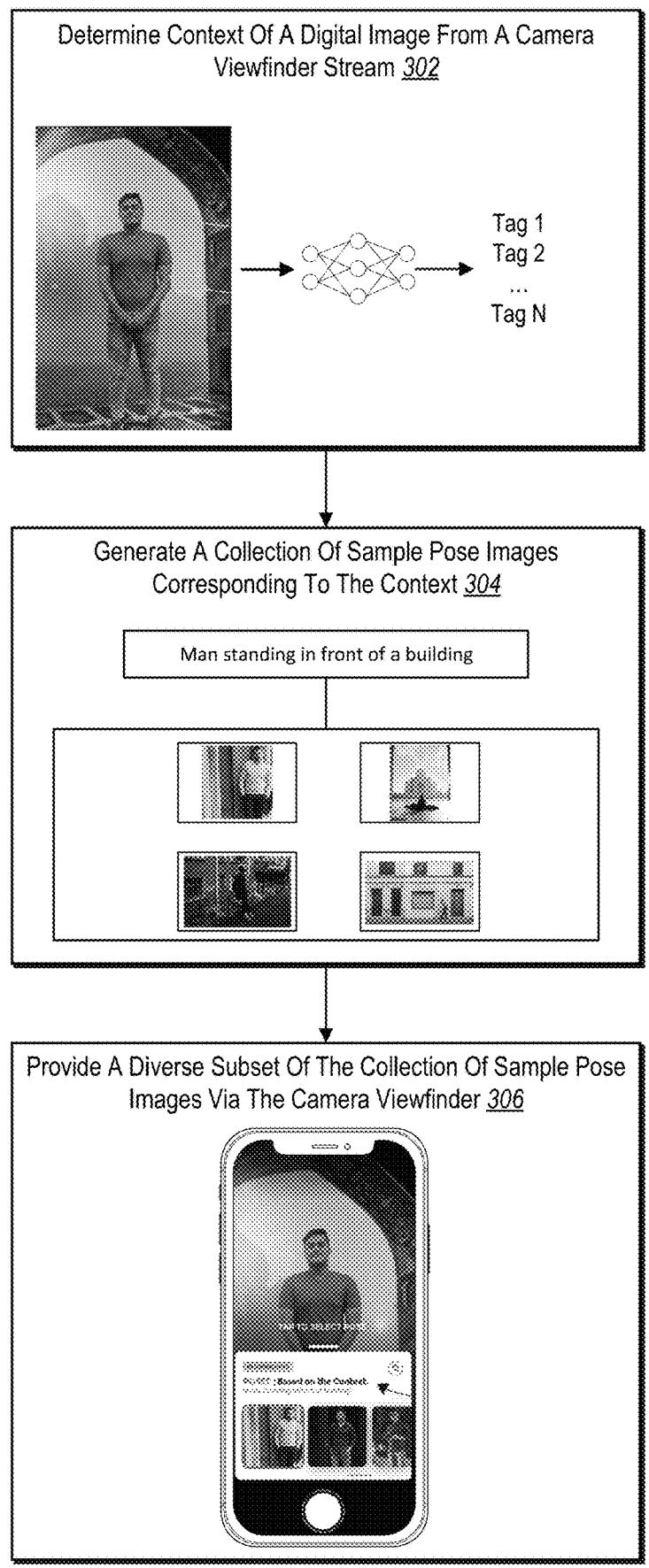
FIG. 3A illustrates an overview of the AR pose system determining a context associated with the camera viewfinder stream of the client computing device, and providing sample pose images that correspond to the determined context in accordance with one or more embodiments.

FIG. 3A illustrates an overview of the AR pose system 102 determining a context associated with the camera viewfinder stream of the client computing device 108, and providing sample pose images that correspond to the determined context. For example, the AR pose system 102 determines a context of an image from the camera viewfinder stream of the client computing device 108 based on contents of the digital image. The AR pose system 102 then generates a collection of sample pose images by generating a search query based on the determined context, and utilizing the generated search query in connection with the sample pose image repository 112 and/or additional search engines available via the third-party system(s) 116. The AR pose system 102 further identifies and provides a diverse subset of the collection of sample pose images via the camera viewfinder of the client computing device 108.

In more detail, the AR pose system 102 performs an act 302 of determining a context of a digital image from a camera viewfinder stream of the client computing device 108. For example, the AR pose system 102 determines the context of the digital image by utilizing one or more machine learning models, neural networks, and algorithms in connection with the digital image. More specifically, the AR pose system 102 utilizes the one or more machine learning models, neural networks, and algorithms to identify characteristics and attributes of the subject and scene depicted in the digital image.

In one or more embodiments, the AR pose system 102 utilizes an object detector neural network to generate one or more object tags associated with the digital image. For example, the AR pose system 102 utilizes the object detector neural network to generate object tags indicating that the digital image depicts one or more of subjects, animals, cars, plants, buildings, and so forth. In at least one embodiment, the object detector neural network generates the object tags including a character string identifying the corresponding object (e.g., "man," "dog," "building"), a location of the corresponding object (e.g., corner coordinates of a bounding box surrounding the corresponding object), and a confidence score.

In more detail, the AR pose system 102 detects one or more objects in the digital image utilizing a Faster-RCNN model (e.g., ResNet-101) trained to detect objects across multiple classes and categories. Additionally, or alternatively, the AR pose system 102 utilizes a different neural network to detect one or more objects, such as ImageNet or DenseNet. Additionally, or alternatively, the AR pose system 102 utilizes an algorithmic approach to detect one or more object such as the You Only Look Once (YOLO) algorithm. In one or more embodiments, the AR pose system 102 detects the one or more objects by generating object identifiers (e.g., object tags) and object positions/locations (e.g., object bounding boxes) within the digital image. In one or more embodiments, the AR pose system 102 utilizes an auto tagging neural network to generate the tags, such as those described in U.S. Pat. No. 9,767,386, "Training A Classifier Algorithm Used For Automatically Generating Tags To Be Applied To Images," filed Jun. 23, 2015; and U.S. Pat. No. 10,235,623, "Accurate Tag Relevance Prediction For Image Search," filed Apr. 8, 2016, the entire contents of both patents are hereby incorporated by reference.

The AR pose system 102 utilizes additional neural networks to generate other tags associated with the digital image. For example, the AR pose system 102 utilizes a gender neural network to generate one or more gender tags associated with the digital image. More specifically, the AR pose system 102 utilizes the gender neural network to perform gender recognition and generate a gender tag associated with each subject depicted in the digital image. For instance, the AR pose system 102 can utilize a face detection model to determine gender of any subject in the digital image such as that described by J. Manikandan et al. in *Face Detection and Recognition using Open CV Based on Fisher Faces Algorithm*, International Journal of Recent Technology and Engineering, Volume-8 Issue-5, January 2020, the entire contents of which are hereby incorporated by reference in their entirety. In still further implementations, the, the AR pose system 102 can utilize a deep cognitive attribution neural network to determine gender of subjects in the digital image such as that described in U.S. patent application Ser. No. 16/564,831, filed on Sep. 9, 2019 and entitled "Identifying Digital Attributes From Multiple Attribute Groups Within Target Digital Images Utilizing A Deep Cognitive Attribution Neural Network," the entire contents of which are hereby incorporated by reference in their entirety.

The AR pose system 102 further optionally utilizes an attire neural network to generate one or more attire tags associated with the digital image. For example, the AR pose system 102 utilizes the attire neural network to generate attire tags indicating articles and types of clothing worn by subjects depicted in the digital image. To illustrate, the AR pose system 102 utilizes the attire neural network to generate attire tags indicating that a subject depicted in the digital image is wearing formal attire, casual attire, athletic attire, wedding attire, and so forth. For instance, the AR pose system 102 utilizes a trained convolutional neural network to generate attire tags and other determinations. In one or more implementations, the attire neural network comprises an object specialist network such as a clothing specialist detection neural network. Additional detail regarding utilizing specialized object detection neural networks is found in U.S. patent application Ser. No. 16/518,880, entitled, "Utilizing Object Attribute Detection Models To Automatically Select Instances Of Detected Objects In Images," filed on Jul. 19, 2019, which is hereby incorporated by reference in its entirety.

In one or more embodiments, the AR pose system 102 determines the context of the digital image based on the generated tags. For example, the AR pose system 102 determines the context by identifying all or a subset of the generated tags that are relevant to a pose-based search query. To illustrate, the AR pose system 102 identifies tags that are specific to the subject depicted in the digital image (e.g., a gender tag, one or more attire tags). The AR pose system 102 further identifies scene-based tags that further provide information about the digital image. For example, the AR pose system 102 identifies scene-based tags that indicate the subject is positioned in a city, positioned at a party, positioned in a park, etc. In at least one embodiment, the AR pose system 102 avoids identifying duplicative tags, such that the resulting body of identified tags are unique.

The AR pose system 102 further performs an act 304 of generating a collection of sample pose images corresponding to the determined context. For example, the AR pose system 102 generates the collection of sample pose images by first generating a search query based on the identified tags. To illustrate, the AR pose system 102 generates the search query by utilizing natural language processing to fit some or all of the identified tags into a logical order. Additionally, or alternatively, the AR pose system 102 generates the search query including the identified tags in any order.

The AR pose system 102 utilizes the generated search query to retrieve one or more sample pose images from the sample pose image repository 112 and/or the third-party system(s) 116. For example, the AR pose system 102 utilizes the search query to identify one or more corresponding sample pose images from the sample pose image repository 112. Additionally, or alternatively, the AR pose system 102 utilizes the search query in connection with the third-party systems(s) 116. For example, the AR pose system 102 provides the search query to one or more third-party search engines. Additionally, or alternatively, the AR pose system 102 provides the search query to one or more third-party applications that are capable of searching for and providing sample pose images.

In response to generating the collection of sample pose images, the AR pose system 102 performs an act 306 of providing a diverse subset of the collection of sample pose images via the camera viewfinder of the client computing device 108. For example, in one or more embodiments, the AR pose system 102 avoids providing similar or duplicative sample pose images via the camera viewfinder of the client computing device 108. Accordingly, the AR pose system 102 identifies the diverse subset of the collection of sample pose images such that the subject includes sample pose images that are unique and varied.

In at least one embodiment, the AR pose system 102 identifies the diverse subset by clustering the sample pose images in the collection of sample pose images based on similarity. For example, the AR pose system 102 utilizes one or more clustering techniques to group visually or semantically similar sample pose images together. The AR pose system 102 then selects a sample pose from each cluster to provide the diverse subset of the collection of sample pose images.

The AR pose system 102 further provides the diverse subset of the collection of sample pose images via the camera viewfinder of the client computing device 108. For example, the AR pose system 102 generates an interactive overlay including the diverse subset of the collection of sample pose images and overlays the interactive overlay on the camera viewfinder. In one or more embodiments, the AR pose system 102 generates the interactive overlay including a horizonal slider including the diverse subset of sample pose images. The AR pose system 102 further generates the interactive overlay such that each of the diverse subset of sample pose images is selectable. In at least one embodiment, the AR pose system 102 generates the interactive overlay including an indicator of the determined context of the digital image taken from the camera viewfinder stream, and a search button whereby the AR pose system 102 receives additionally inputted contextual search terms.

Figure 3B:
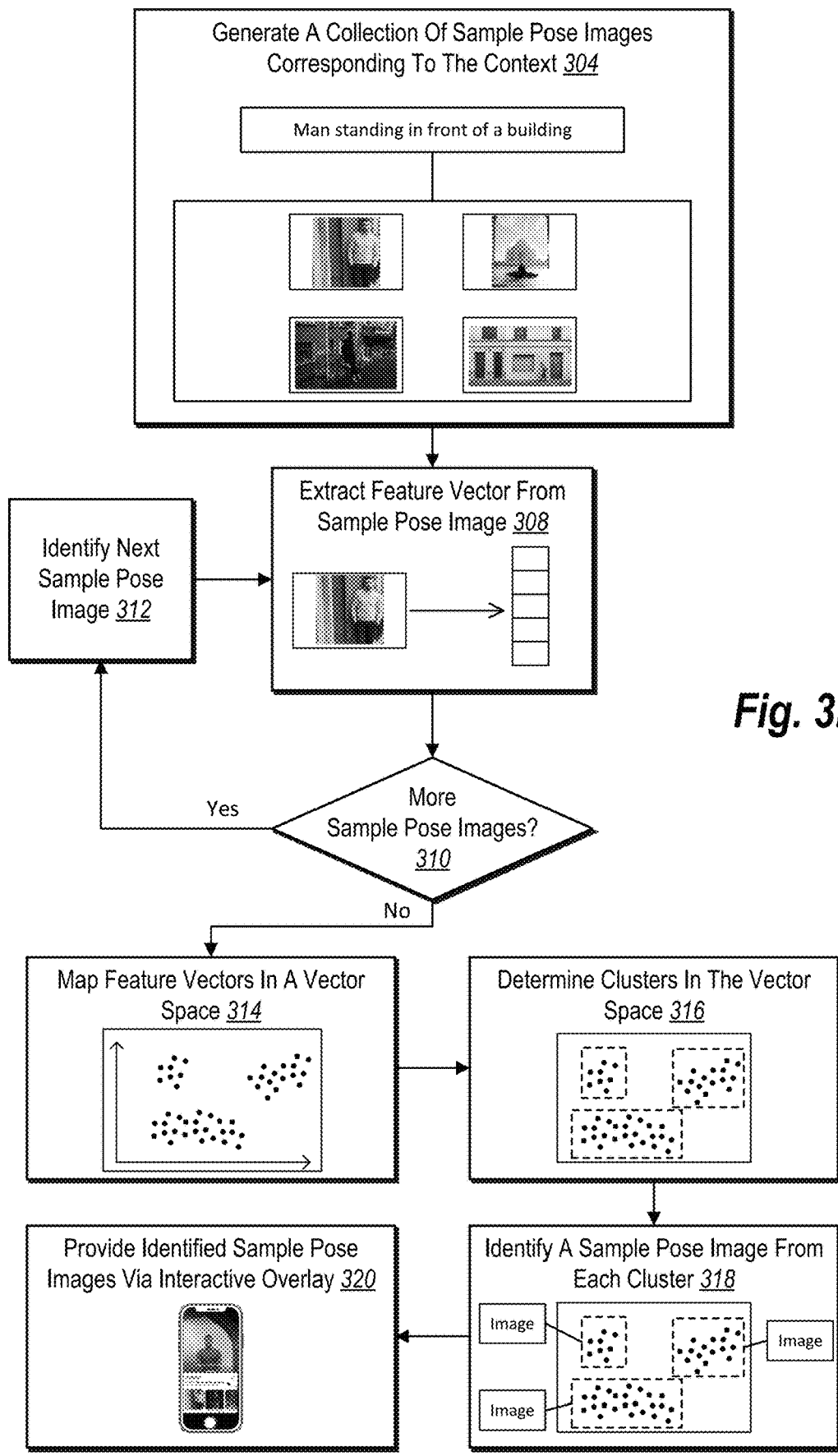
FIG. 3B illustrates the AR pose system determining the diverse subset of the collection of sample pose images in accordance with one or more embodiments.

FIG. 3B illustrates the AR pose system 102 determining the diverse subset of the collection of sample pose images. As mentioned above, the AR pose system 102 utilizes one or more clustering techniques to identify and provide sample pose images that are unique and non-duplicative. For example, as shown in FIG. 3B, the AR pose system 102 performs the act 304 of generating the collection of sample pose images corresponding to the context of the digital image taken from the camera viewfinder stream. As discussed above with reference to FIG. 3A, the AR pose system 102 generates the collection of sample pose images in response to receiving sample pose images from the sample pose image repository 112 and/or the third-party system(s) 116.

In response to generating the collection of sample pose images, the AR pose system 102 performs an act 308 of extracting a feature vector from one of the sample pose images from the generated collection. In one or more embodiments, the AR pose system 102 extracts a feature vector from a sample pose image by generating one or more numeric values representing characteristics and attributes of the sample pose image. In particular, the AR pose system 102 generates a feature vector including encoded information describing characteristics of the sample pose image. For instance, the AR pose system 102 generates the feature vector including a set of values corresponding to latent and/or patent attributes and characteristics of the sample pose image. In one or more embodiments, the AR pose system 102 generates the feature vector as a multi-dimensional dataset that represents or characterizes the sample pose image. In one or more embodiments, the extracted feature vector includes a set of numeric metrics learned by a machine-learning algorithm, such as neural network. In at least one embodiment, the AR pose system 102 utilizes one or more algorithms (e.g., the SciKit-Learn Library) to extract a feature vector from a sample pose image.

Next, the AR pose system 102 performs an act 310 of determining whether there are more sample pose images in the collection of sample pose images that have no corresponding feature vector. If there are additional sample pose images (e.g., "Yes" in the act 310), the AR pose system 102 performs the act 312 of identifying a next sample pose image in the collection of sample pose images. The AR pose system 102 then repeats the act 310 in connection with the next sample pose image. The AR pose system 102 continues to extract feature vectors from the sample pose images in the collection of sample pose images until all of the feature vectors have been extracted (e.g., "No" in the act 310).

With all of the feature vectors extracted, the AR pose system 102 performs an act 314 of mapping the extracted feature vectors in a vector space. For example, the AR pose system 102 maps the extracted feature vectors as points in a vector space. In one or more embodiments, the vector space is in an n-dimensional vector space, where n is the number of features represented in each vector.

Next, the AR pose system 102 performs an act 316 of determining clusters of feature vectors in the vector space. For example, the AR pose system 102 determines clusters of feature vectors by grouping each feature vector with its nearest neighbor. In one embodiment, the AR pose system 102 performs k-means clustering to cluster the feature vectors. For example, the AR pose system 102 utilizes k-means clustering by partitioning the vector space such that each feature vector belongs to a cluster with the nearest mean (e.g., cluster center). In alternative embodiments, the AR pose system 102 utilizes other clustering algorithms.

As part of partitioning the vector space, the AR pose system 102 determines distances between feature vectors. For example, the AR pose system 102 calculates distances between feature vectors to determine the appropriate cluster with which to group a feature vector. The AR pose system 102 may calculate distances between feature vectors using various methods. In one embodiment, the AR pose system 102 determines a Euclidean distance between feature vectors. In another embodiment, the AR pose system 102 utilizes the Minkowski method to calculate distances between feature vectors.

To further identify the diverse subset of the collection of sample pose images, the AR pose system 102 performs an act 318 of identifying a sample pose image from each cluster. For example, the AR pose system 102 identifies a feature vector from each cluster, and then provide the diverse subset as the sample pose images that correspond to the identified feature vectors. In one or more embodiments, the AR pose system 102 identifies the feature vector from a particular cluster by randomly selecting the feature vector from the cluster. Additionally, or alternatively, the AR pose system 102 identifies a feature vector from the cluster by selecting the feature vector closest to the center of the cluster.

The AR pose system 102 further performs an act 320 of providing the identified sample pose images via an interactive overlay positioned on the camera viewfinder of the client computing device 108. For example, the AR pose system 102 generates the interactive overlay including a predetermined number of the diverse subset of the collection of sample pose images. Additionally or alternatively, the AR pose system 102 generates the interactive overlay including all of the diverse subset of the collection of sample pose images in a horizontal slider. The AR pose system 102 further positions the generated interactive overlay on a portion of the camera viewfinder of the client computing device 108.

Figure 4A:
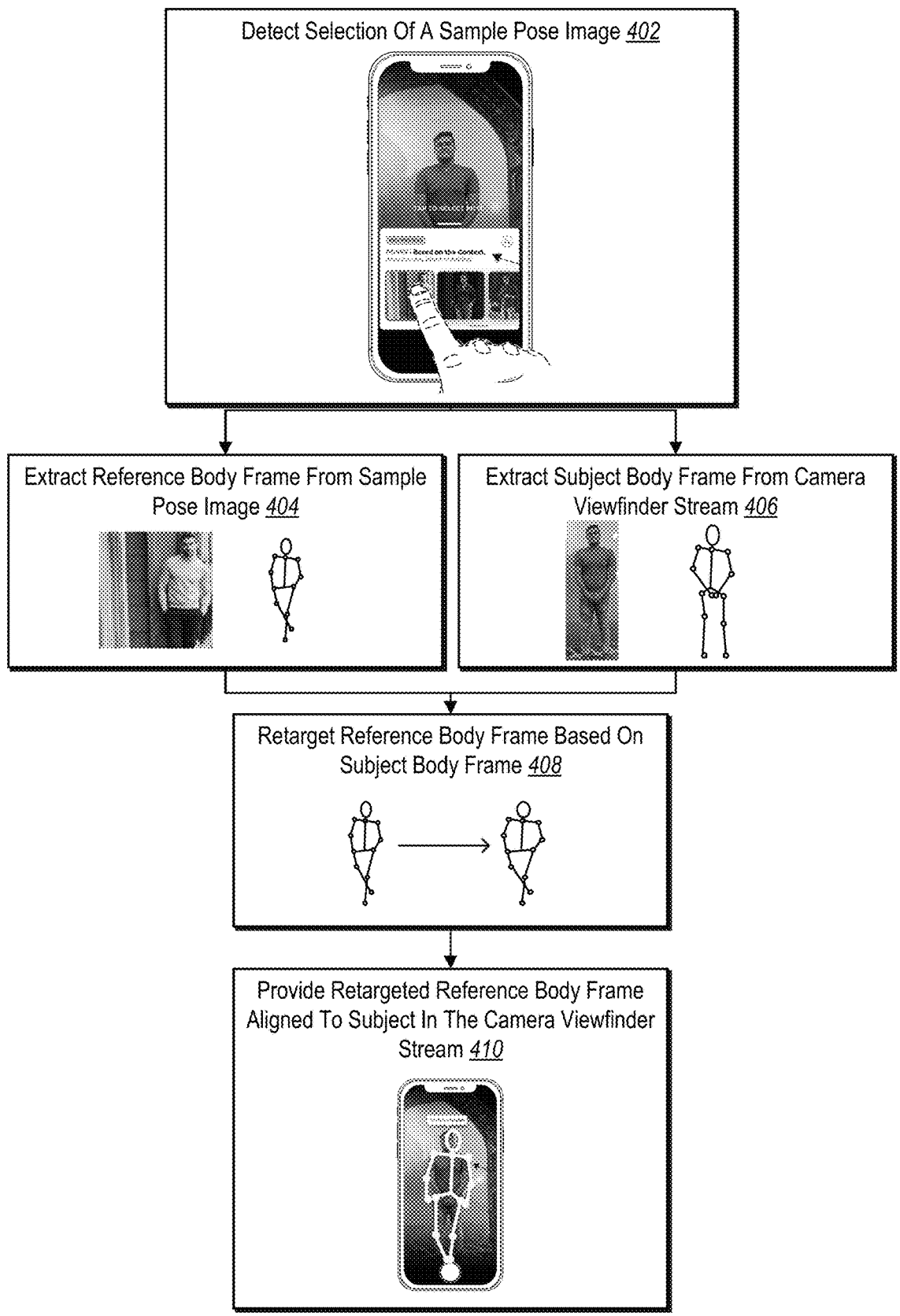
FIG. 4A illustrates the AR pose system providing a pose guide via the camera viewfinder of the client computing device in accordance with one or more embodiments.

FIG. 4A illustrates the AR pose system 102 providing a pose guide via the camera viewfinder of the client computing device 108. As mentioned above, the AR pose system 102 provides a pose guide that is a body frame extracted from a selected sample pose image and retargeted based on proportions of the subject. Utilizing the retargeted reference body frame as a pose guide, the AR pose system 102 provides visual guidance enabling the subject in the camera viewfinder stream to pose their body parts to mimic the pose displayed in the selected sample pose image.

As shown in FIG. 4A, the AR pose system 102 performs an act 402 of detecting a selection of a sample pose image. As discussed above, the AR pose system 102 generates an interactive overlay including selectable sample pose images. Accordingly, the AR pose system 102 detects a selection (e.g., a tap touch gesture, a mouse click) of a sample pose image via the camera viewfinder of the client computing device 108.

In response to the detected selection of the sample pose image, the AR pose system 102 performs an act 404 of extracting a reference body frame from the selected sample pose image. In one or more embodiments, the AR pose system 102 extracts a reference body frame from the selected sample pose image by identifying locations for joints and segments of the subject (e.g., the human figure) depicted in the selected sample pose image. For example, the AR pose system 102 utilizes full body tracking via a pose neural network to identify locations of joints and segments of the subject in the selected sample pose image. In at least one embodiment, the AR pose system 102 further utilizes the pose neural network to generate a reference body frame (e.g., a digital skeleton) that includes the joints and segments in the determined locations.

Also in response to the detected selection of the sample pose image, the AR pose system 102 performs an act 406 of extracting a subject body frame from the camera viewfinder stream of the client computing device 108. For example, the AR pose system 102 utilizes the pose neural network in connection with a digital image from the camera viewfinder stream of the client computing device 108 to identify locations of joints and segments of the subject depicted in the camera viewfinder stream. The AR pose system 102 further utilizes the pose neural network to generate a subject body frame (e.g., a digital skeleton) that includes the joints and segments in the determined locations. Although FIG. 4A shows the AR pose system 102 performing the acts 404 and 406 in parallel, in additional or alternative embodiments, the AR pose system 102 performs the acts 404 and 406 in sequence (e.g., performs the act 404 then performs the act 406).

The AR pose system 102 further performs an act 408 of retargeting the reference body frame based on the subject body frame. For example, the AR pose system 102 retargets the reference body frame by first determining lengths of segments between the joints of the subject body frame (e.g., indicating the proportions of the subject depicted in the digital image from the camera viewfinder stream). The AR pose system 102 further retargets the reference body frame by modifying lengths of the segments between the joints in the reference body frame to match the lengths of the segments between corresponding joints of the subject body frame. Accordingly, the retargeted reference body frame retains the original pose indicated by the selected sample pose image, but has the proportions of the subject depicted in the camera viewfinder stream.

The AR pose system 102 next performs an act 410 of providing the retargeted reference body frame aligned to the subject in the camera viewfinder stream. For example, the AR pose system 102 provides the retargeted reference body frame as the pose guide overlaid on the camera viewfinder based on one or more landmarks relative to the subject depicted in the camera viewfinder stream. To illustrate, the AR pose system 102 identifies one or more landmarks of the subject depicted in the camera viewfinder stream such as, but not limited to a hip region and a chest region. The AR pose system 102 then generates a visualization of the retargeted reference body frame including the joints and segments of the retargeted reference body frame, and anchors the visualization to the camera viewfinder at the identified landmarks of the subject.

In one or more embodiments, the AR pose system 102 performs the acts 402-410 in connection with additional subjects depicted in both the camera viewfinder stream and the selected sample pose image. For example, if the camera viewfinder stream depicts two subjects and the selected sample pose image also depicts two posed subjects, the AR pose system 102 repeats the acts 402-410 for the second subjects. In at least one embodiment, the AR pose system 102 determines which subject in the sample pose image corresponds to which subject in the camera viewfinder stream in response to a user input. If the camera viewfinder stream depicts two subjects and the selected sample pose image depicts one subject, the AR pose system 102 performs the acts 402-410 in response to user input indicating which of the two subjects the AR pose system 102 will utilize in connection with generating a pose guide.

Figure 4B:
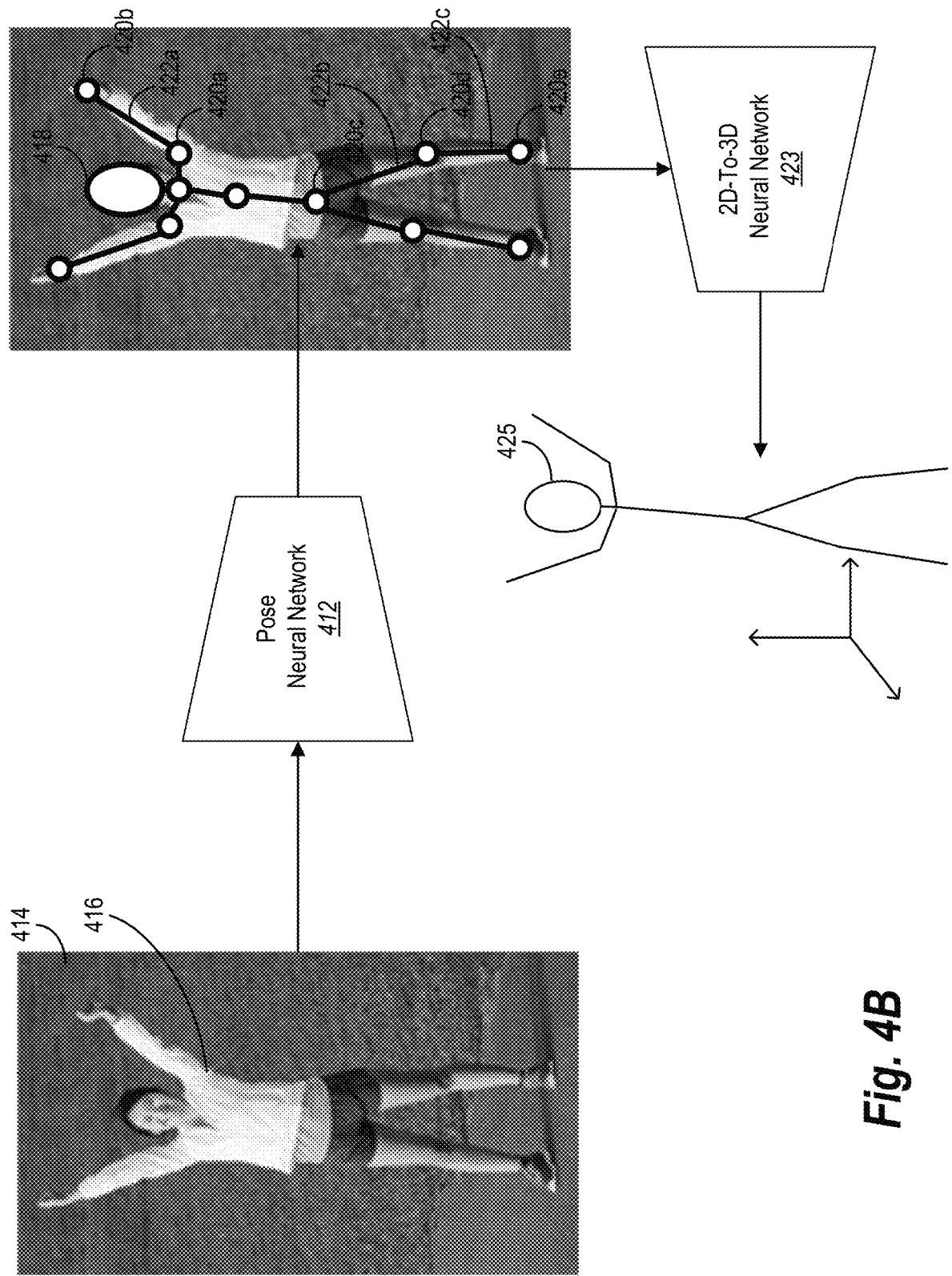
FIG. 4B illustrates the AR pose system utilizing a pose neural network to extract body frames from a digital image in accordance with one or more embodiments.

FIG. 4B illustrates the AR pose system 102 utilizing a pose neural network 412 to extract body frames (e.g., a reference body frame, a subject body frame) from a digital image. As mentioned, in some embodiments, the AR pose system 102 determines or extracts a body frame of subject depicted within a digital image (e.g., a digital image from a camera viewfinder stream of the client computing device 108 or a sample pose image). In particular, the AR pose system 102 utilizes a pose neural network to determine locations and tags of joints and segments for a subject (e.g., a human figure) depicted in a digital image.

As illustrated in FIG. 4B, the AR pose system 102 identifies a digital image 414. In particular, the AR pose system 102 receives the extracted digital image 414 from a camera viewfinder stream of the client computing device 108, or a selection or an upload of the digital image 414 as a sample pose image. In addition, the AR pose system 102 determines a two-dimensional body frame 418 (e.g., a subject body frame or a reference body frame) associated with the digital image 414. For example, the AR pose system 102 utilizes a pose neural network 412 to identify a subject 416 depicted within the digital image 414 and to determine locations of joints and segments of the subject 416. In some embodiments, the AR pose system 102 utilizes the pose neural network 412 to identify all of the two-dimensional joints from the digital image 414. For example, the AR pose system 102 utilizes the pose neural network 412 to extract two-dimensional joint vectors or segments 422a, 422b, 422c associated with each joint 420a, 420b, 420c, 420d, 420e corresponding to the subject 416 in the digital image 414.

In one or more embodiments, the AR pose system 102 utilizes a pose neural network 412 in the form of a convolutional neural network to, from the input digital image 414 of the subject 416 (e.g., a human figure), jointly predict confidence maps for body part detection and part affinity fields to learn associated body parts for the subject. For example, to identify body parts, the AR pose system 102 generates a confidence map that includes a two-dimensional representation of confidence measures that a particular body part (e.g., an head or a torso) is located at any given pixel. To identify limbs connecting the body parts, the AR pose system 102 also generates part affinity fields that include a two-dimensional vector field for each limb, including location and orientation information across the region of support for the limb. The AR pose system 102 generates a part affinity field for each type of limb joining two associated body parts. In addition, the AR pose system 102 utilizes the pose neural network 412 to parse the digital image 414 into portions for bipartite matching of associated body part candidates. For example, the AR pose system 102 utilizes a pose neural network 412 such as the pose neural network described by Zhe Cao, Gines Hidalgo, Tomas Simon, Shih-en Wei, and Yaser Seikh in *OpenPose: Realtime Multi-Person 2D Pose Estimation using Part Affinity Fields* arXiv:1812.08008 (2018), which is incorporated by reference herein in its entirety. In some cases, the pose neural network 412 is a hybrid neural network based on a combination of GoogleNet and OpenPose. The AR pose system 102 utilizes a variety of neural network architectures to determine a pose.

As further illustrated in FIG. 4B, the AR pose system 102 generates a three-dimensional body frame 425 from the two-dimensional body frame 418. In particular, the AR pose system 102 utilizes the 2D-to-3D neural network 423 to process the two-dimensional body frame 418 and generate the three-dimensional body frame 425. For example, the AR pose system 102 utilizes the 2D-to-3D neural network 423 to generate three-dimensional joint features for the joints identified in the two-dimensional body frame 418. Indeed, the AR pose system 102 utilizes the 2D-to-3D neural network 423 to project the two-dimensional joint features onto a unit sphere to thereby generate three-dimensional joint features.

In some embodiments, the AR pose system 102 utilizes a 2D-to-3D neural network 423 that estimates body joint locations in three-dimensional space (e.g., the three-dimensional body frame 425) from a two-dimensional input (e.g., the two-dimensional body frame 418). For instance, the AR pose system 102 utilizes a 2D-to-3D neural network 423 in the form of a deep feed-forward neural network that generates a series of points in three-dimensional space from a series of two-dimensional points. In particular, the AR pose system 102 utilizes the 2D-to-3D neural network 423 to learn a function that reduces or minimizes prediction error of predicting three-dimensional points by projecting two-dimensional points onto a fixed global space (with respect to a root joint) over a dataset of a particular number of posed subjects and corresponding body frames. For example, the AR pose system 102 utilizes a 2D-to-3D neural network 423 such as the 2D-to-3D neural network described by Julieta Martinez, Rayat Hossain, Javier Romero, and James J. Little in *A Simple Yet Effective Baseline for 3D Human Pose Estimation* arXiv:1705.03098 (2017), which is incorporated by reference herein in its entirety. The AR pose system 102 utilizes a variety of machine learning models (e.g., neural networks) to project two-dimensional joint features and generate three-dimensional joint features.

In some embodiments, the AR pose system 102 further generates a visualization of the three-dimensional body frame 425. More specifically, as shown in FIG. 4B, the AR pose system 102 arranges three-dimensional virtual joints and three-dimensional virtual segments overlaid at locations corresponding to the joints and segments of the subject 416 depicted in the digital image 414. In one or more embodiments, the AR pose system 102 utilizes the visualization of the three-dimensional body frame 425 as a pose guide after retargeting the three-dimensional body frame 425 based on the proportions of a subject depicted in the camera viewfinder stream of the client computing device 108.

Figure 4C:
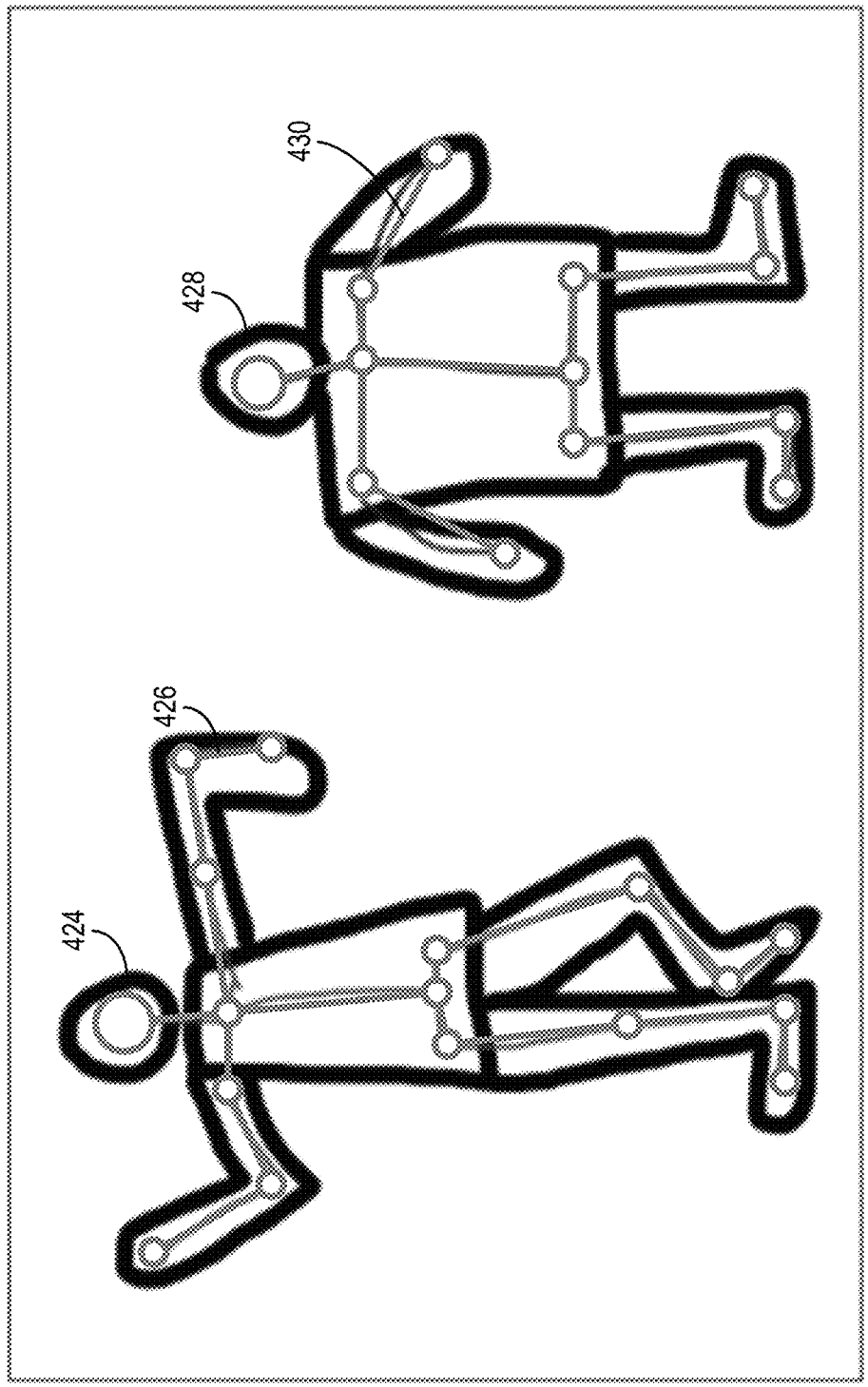
FIGS. 4C and 4D illustrate the AR pose system retargeting a reference body frame based on proportions of the subject depicted in the camera viewfinder stream of the client computing device in accordance with one or more embodiments.
Figure 4D:
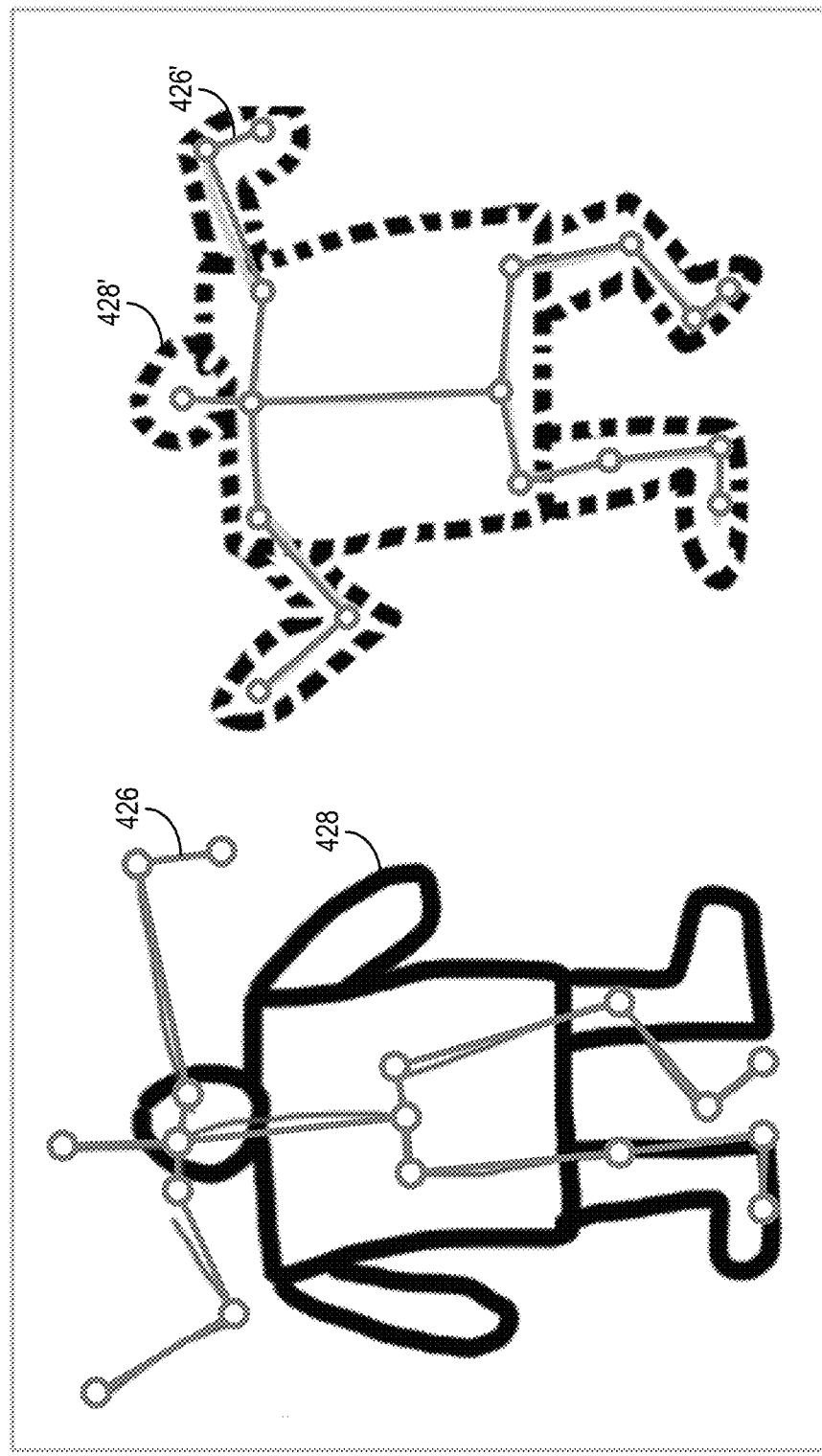

FIGS. 4C and 4D illustrate the AR pose system 102 retargeting a reference body frame based on proportions of the subject depicted in the camera viewfinder stream of the client computing device 108. For example, as shown in FIG. 4C, the AR pose system 102 utilizes the pose neural network 412 in connection with the 2D-to-3D neural network 423 to extract a reference body frame 426 from a reference subject 424 (e.g., depicted in a selected sample pose image), and to extract a subject body frame 430 from a target subject 428 (e.g., depicted in a camera viewfinder stream of the client computing device 108).

As shown in FIG. 4C, the proportions of the reference subject 424 are different from the proportions of the target subject 428. This proportional difference is common between sample pose images that often depict professional models and subjects in camera viewfinder streams who are often not professional models. If the AR pose system 102 were to use the reference body frame 426 as a pose guide without retargeting, the result would be as shown in FIG. 4D. For example, the person represented by the target subject 428 would likely have difficulty mimicking the pose indicated by the reference body frame 426 due to the proportions of the target subject 428 being dissimilar and untethered from the proportions of the reference body frame 426.

Thus, to provide a customized pose guide relative to the person represented by the target subject 428, the AR pose system 102 retargets the reference body frame 426. In one or more embodiments, the AR pose system 102 retargets the reference body frame 426 by first determining lengths of the segments between the joints of the subject body frame 430 (e.g., as shown in FIG. 4C). For example, the AR pose system 102 determines pixel lengths of each segment in the subject body frame 430 as well as the position of each segment relative its neighboring joints.

Next, the AR pose system 102 retargets the reference body frame 426 by modifying lengths of segments between joints of the reference body frame 426 to match the determined lengths of the segments between corresponding joints of the subject body frame 430. For example, the AR pose system 102 lengthens or shortens segments of the reference body frame 426 to match the lengths of corresponding segments in the subject body frame 430. The AR pose system 102 determines that a segment in the reference body frame 426 corresponds to a segment in the subject body frame 430 by maintaining relative positions of segments and surrounding joints between both the reference body frame 426 and the subject body frame 430. Thus, the AR pose system 102 determines, for example, that a segment between a knee joint and an ankle joint in the reference body frame 426 corresponds to a segment between a knee joint and an ankle joint in the subject body frame 430.

Accordingly, as further shown in FIG. 4D, the AR pose system 102 generates the retargeted reference body frame 426'. In one or more embodiments, by lengthening or shortening segments of the reference body frame 426, the AR pose system 102 generates the retargeted reference body frame 426' that includes the proportions of the target subject 426. Thus, the person represented by the target subject 426 more easily mimics the pose indicated by the retargeted reference body frame 426' (e.g., as indicated by the target subject 426' in FIG. 4D).

In additional or alternative embodiments, the AR pose system 102 generates the retargeted reference body frame 426' utilizing motion retargeting. For example, the AR pose system 102 utilizes motion retargeting in connection with the subject body frame 430 by arranging the segments of the subject body frame 430 to match the pose indicated by the reference body frame 426. To illustrate, the AR pose system 102 determines relative positions of and angles between sequential segments of the reference body frame 426. The AR pose system 102 then manipulates corresponding segments of the subject body frame 430 to match the determined positions and angles.

Figure 4E:
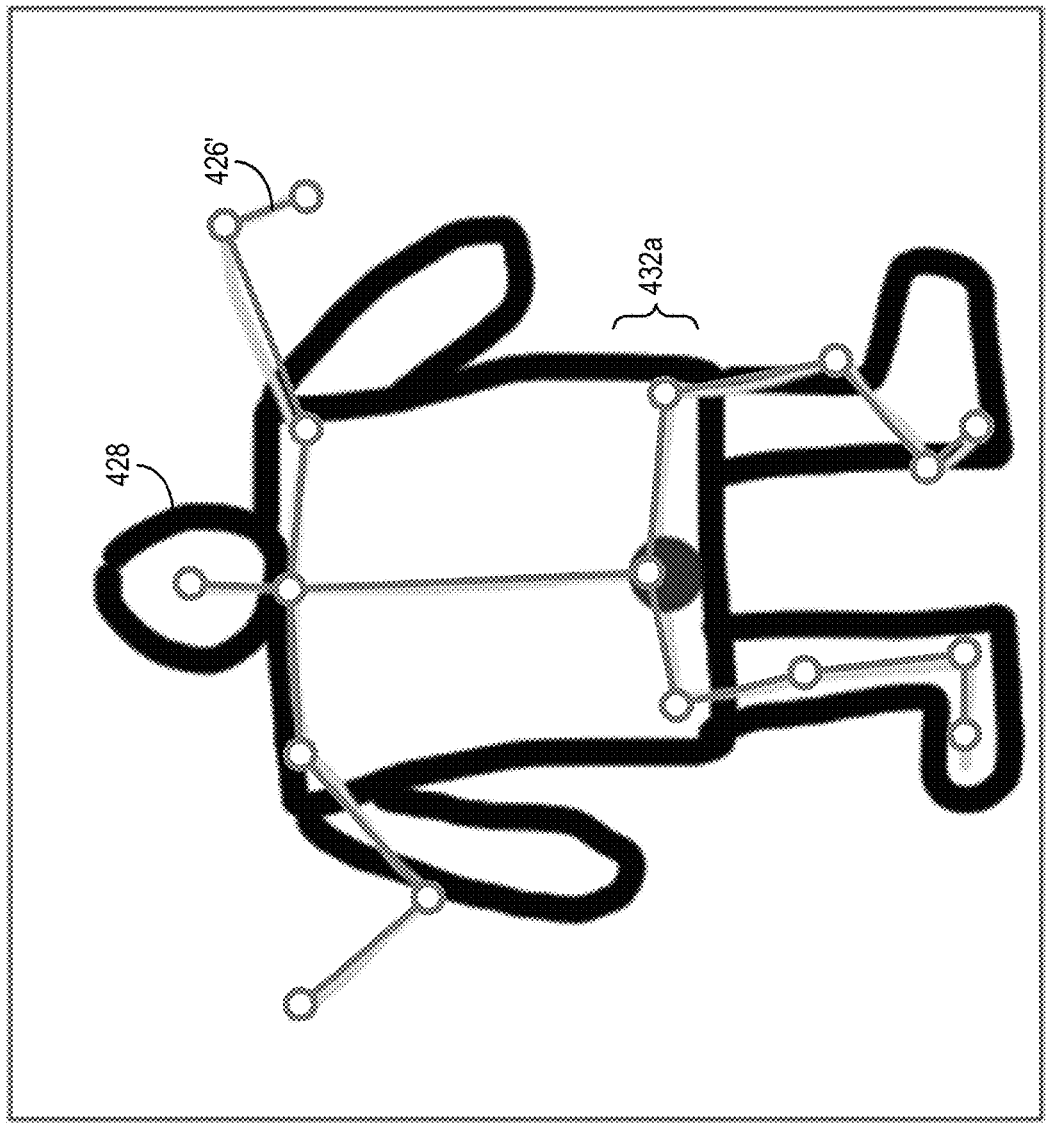
FIGS. 4E and 4F illustrate the AR pose system aligning a retargeted reference body frame to the target subject in accordance with one or more embodiments.
Figure 4F:
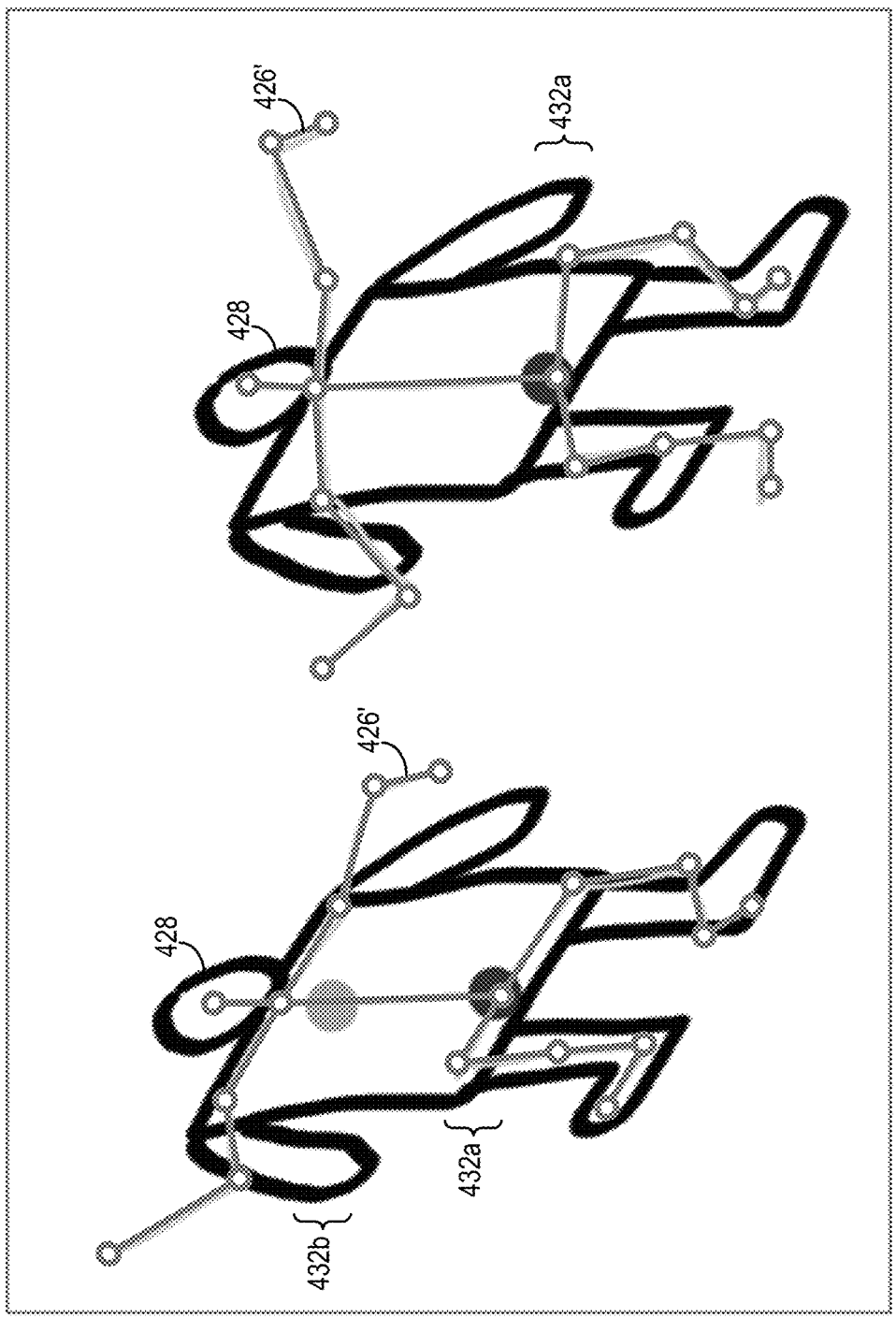

FIGS. 4E and 4F illustrate the AR pose system 102 aligning the retargeted reference body frame 426' to the target subject 428. In one or more embodiments, the AR pose system 102 aligns the retargeted reference body frame 426' based on at least one landmark 432a of the target subject 428. For example, the AR pose system 102 determines the landmark 432a (e.g., a hip region) based on a tag generated by the pose neural network 412. To illustrate, the AR pose system 102 determines that the landmark 432a correspond with a position of a joint with a "hip joint" tag in the retargeted reference body frame 426'.

The AR pose system 102 further determines a corresponding landmark of the target subject 428. For example, the AR pose system 102 determines the corresponding landmark of the target subject 428 by generating an updated subject body frame for the target subject 428 (e.g., including locations and tags of segments and joints) and align the retargeted reference body frame 426a with the updated subject body frame at the segment and/or joint with the tag corresponding with the landmark 432a (e.g., "hip joint"). The AR pose system 102 performs this alignment in connection with a subject body frame (e.g., not visible in a camera viewfinder), a retargeted reference body frame (e.g., not visible in a camera viewfinder), and/or a visualization of the retargeted reference body frame (e.g., visible in a camera viewfinder).

FIG. 4F illustrates the AR pose system 102 aligning the retargeted reference body frame 426' based on more than one landmark of the target subject 428. In one or more embodiments, the AR pose system 102 aligns the retargeted reference body frame 426a' across multiple landmarks 432a, 432b (e.g., a hip region and a torso region) to account for possible rotation of the target subject 428 toward or away from a camera of the client computing device 108.

For example, as shown in FIG. 4F, when the target subject 428 rotates relative to the camera of the client computing device 108 and the AR pose system 102 anchors the retargeted reference body frame 426' to only one landmark 432a, the result is that the person represented by the target subject 428 would find it impossible to correctly align their limbs with those represented by the retargeted reference body frame 426'. Conversely, when the AR pose system 102 anchors the retargeted reference body frame 426' to at least two landmarks, the shoulders, hips, legs, and arms represented by the retargeted reference body frame 426' correctly positioned relative to corresponding regions of the target subject 428.

Figure 5A:
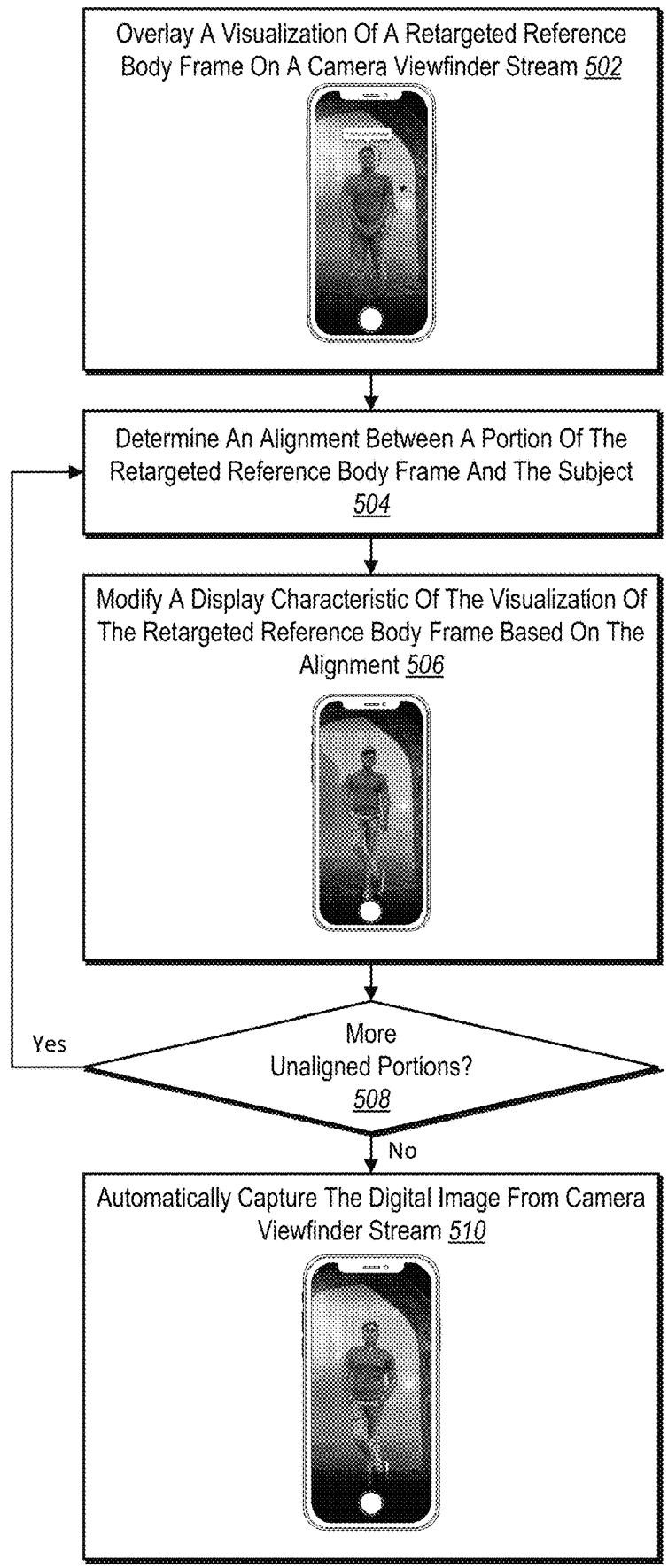
FIG. 5A illustrates the AR pose system determining alignments between a pose guide and a subject depicted in a camera viewfinder stream and modifying display characteristics of the pose guide to iteratively and continuously provide pose guidance to a user of the client computing device in accordance with one or more embodiments.

FIG. 5A illustrates the AR pose system 102 determining alignments between a pose guide and a subject depicted in a camera viewfinder stream and modifying display characteristics of the pose guide to iteratively and continuously provide pose guidance to a user of the client computing device 108. For example, as will be discussed in greater detail below, the AR pose system 102 overlays a visualization of a retargeted reference body frame (e.g., a pose guide) on a camera viewfinder. The AR pose system 102 iteratively determines alignments between portions of the retargeted reference body frame and corresponding portions of the subject depicted in the camera viewfinder. For each determined alignment, the AR pose system 102 modifies a display characteristic of a corresponding portion or segment of the visualization of the retargeted reference body to indicate the alignment. In response to determining that all the segments of the retargeted reference body frame are aligned with corresponding segments of the subject, the AR pose system 102 automatically captures a digital image from the camera viewfinder stream of the client computing device 108.

In more detail, the AR pose system 102 performs an act 502 of overlaying a visualization of a retargeted reference body frame on a camera viewfinder of the client computing device 108. As discussed above, the AR pose system 102 generates the retargeted reference body frame by modifying proportions of segments of a reference body frame extracted from a selected sample pose image based on proportions of a subject body frame extracted from a digital image depicting the subject. The AR pose system 102 further generates a visualization of retargeted reference body frame including segment lines with colors, patterns, animations, etc. and joints represented by dots or other shapes in the same or different colors, patterns, animations, etc. as the segment lines.

Also as discussed above, the AR pose system 102 overlays the visualization of the retargeted reference body frame on the camera viewfinder of the client computing device 108 by anchoring the visualization of the retargeted reference body frame to the subject depicted in the camera viewfinder. For example, the AR pose system 102 determines one or more landmarks of the subject (e.g., a hip region, a torso region), and anchors corresponding points of the visualization of the retargeted reference body frame to those landmarks.

The AR pose system 102 also performs an act 504 of determining an alignment between a portion of the retargeted reference body frame and the subject depicted in the camera viewfinder. For example, and as will be discussed in greater detail below with reference to FIG. 5B, the AR pose system 102 determines that a portion (e.g., one or more joints and segments) of the retargeted reference body frame is aligned with a corresponding portion of the subject based on an updated subject body frame anchored to the subject at the same one or more landmarks as the retargeted reference body frame. More specifically, the AR pose system 102 determines that a portion of the retargeted reference body frame is aligned with a corresponding portion of the subject when one or more segments and/or joints of the retargeted reference body frame overlay corresponding one or more segments and/or joints of the updated subject body frame when both body frames are anchored to the subject at the same landmark(s).

In response to determining an alignment between the portion of the retargeted reference body frame and the subject, the AR pose system 102 performs an act 506 of modifying a display characteristic of the visualization of the reference body frame based on the alignment. For example, in response to determining an alignment between an arm portion of the retargeted reference body frame and the subject, the AR pose system 102 modifies a display characteristic of the corresponding arm portion of the visualization of the retargeted reference body frame in the camera viewfinder. In one or more embodiments, the AR pose system 102 modifies display characteristics of the visualization including, but not limited to, modifying a display color of the aligned portion of the visualization, modifying a line type (e.g., from a solid line to a dashed line) of the aligned portion of the visualization, modifying a line width (e.g., from a thin line to a thick line) of the aligned portion of the visualization. In additional or alternative embodiments, the AR pose system 102 modifies display characteristics of the visualization by adding animations or highlights to portions of the visualization to indicate the alignment.

The AR pose system 102 further performs an act 508 of determining whether there are additional unaligned portions of the visualization of the retargeted reference body frame. For example, the AR pose system 102 determines that there are additional unaligned portions of the visualization in response to determining that there is at least one portion of the visualization exhibiting original or unmodified display characteristics.

In response to determining that there are additional unaligned portions of the visualization (e.g., "Yes" in the act 508), the AR pose system 102 repeats the acts 504 and 506 of determining an alignment between a portion of the visualization and the subject and modifying a display characteristic of the portion. In at least one embodiment, the AR pose system 102 performs the act 504 in connection with an updated subject body frame representing an updated pose of the subject depicted in the camera viewfinder. For example, and in order to account for additional movement of the subject as the subject attempts to mimic the pose represented by the retargeted reference body frame, the AR pose system 102 utilizes the pose neural network 412 in connection with the 2D-to-3D neural network 423 to generate an updated subject body frame corresponding to the subject.

Therefore, the AR pose system 102 generates updated subject body frames associated with the subject each time an alignment is determined. Additionally, the AR pose system 102 generates an updated subject body frame at regular intervals. For example, the AR pose system 102 generates an updated subject body frame every predetermined number of camera viewfinder stream frames (e.g., every 30 frames). In another example, the AR pose system 102 generates the updated subject body frame after the passage of a predetermined amount of time (e.g., every 5 seconds). The AR pose system 102 further anchors the updated subject body frame to the same landmark of the subject as the retargeted reference body frame prior to the next iteration of the acts 504 and 506.

In one or more embodiments, the AR pose system 102 continues to iteratively perform the acts 504, 506, and 508 until the AR pose system 102 determines that there are no additional unaligned portions of the visualization of the retargeted reference body frame (e.g., "No" in the act 508). In response to determining that there are no additional unaligned portions of the visualization of the retargeted reference body frame, the AR pose system 102 performs an act 510 of automatically capturing a digital image from the camera viewfinder stream of the client computing device 108. For example, the AR pose system 102 stores the captured digital image locally (e.g., within a camera roll of the client computing device 108). The AR pose system 102 further provides the captured digital image to the image capturing system 104 along with information associated with the retargeted reference body frame, the subject body frame, and/or the selected sample pose image. In response to automatically capturing the digital image, the AR pose system 102 further removes the visualization of the retargeted reference body frame from the camera viewfinder of the client computing device 108. In one or more embodiments, the AR pose system 102 concurrently performs the acts 502-510 in connection with multiple subjects depicted in the camera viewfinder.

Figure 5B:
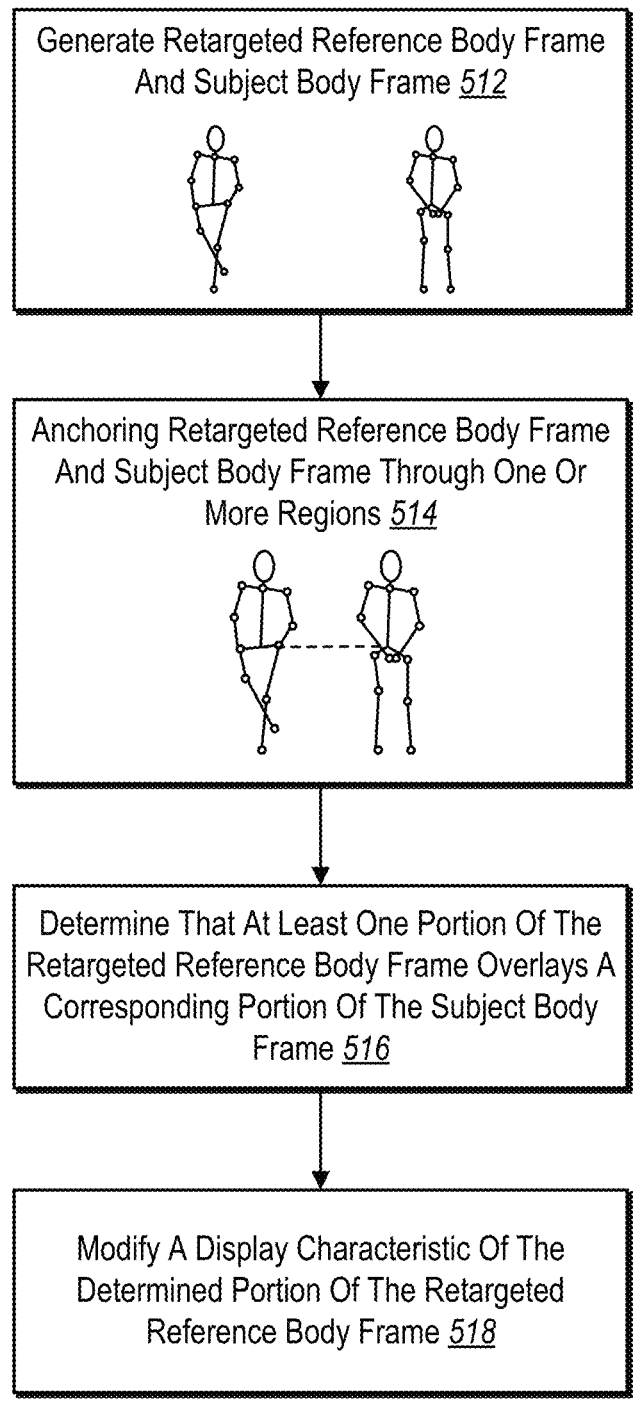
FIG. 5B illustrates additional detail with regard to how the AR pose system determines an alignment between a portion of the retargeted reference body frame and the subject depicted in the camera viewfinder of the client computing device in accordance with one or more embodiments.

FIG. 5B illustrates additional detail with regard to how the AR pose system 102 determines an alignment between a portion of the retargeted reference body frame and the subject depicted in the camera viewfinder of the client computing device 108. For example, as mentioned above with regard to the act 504 performed by the AR pose system 102, the AR pose system 102 determines the alignment based on a continuously updated subject body frame simultaneously anchored to the subject in the camera viewfinder.

In more detail, the AR pose system 102 performs an act 512 of generating the retargeted reference body frame and the subject body frame. As discussed above, in at least one embodiment, the AR pose system 102 generates these body frames utilizing the pose neutral network 412 that identifies relative positions of joints and segments of subjects displayed in digital images and the 2D-to-3D neural network 423 to generate a three-dimensional body frames. In one or more embodiments, the AR pose system 102 iteratively and continuously generates updated subject body frames to account for movement of the subject within the camera viewfinder stream.

For each iteration, the AR pose system 102 performs an act 514 of anchoring the retargeted reference body frame and the subject body frame (e.g., whether the original subject body frame, or an updated subject body frame in a subsequent iteration) to the subject through one or more regions. For example, the AR pose system 102 anchors both body frames to the subject through at least a hip region of the subject. It is noted that while the AR pose system 102 may display a visualization of the retargeted reference body frame anchored to the subject within the camera viewfinder, the AR pose system 102 may not display a visualization of the subject body frame anchored to the subject within the camera viewfinder. Thus, the simultaneously anchored subject body frame may not be viewable, even though it is present.

The AR pose system 102 further performs an act 516 of determining that at least one portion of the retargeted reference body frame overlays a corresponding portion of the subject body frame. In one or more embodiments, the AR pose system 102 determines that a portion of the retargeted reference body frame overlays a corresponding portion of the subject body frame by determining 1) whether any portion of the retargeted reference body frame overlay any portion of the subject body frame, and 2) whether the overlaying portions of both body frames correspond (e.g., represent the same body part or parts).

In more detail, the AR pose system 102 determines whether any portion (e.g., one or more segments and/or joints) of the retargeted reference body frame overlay any portion of the subject body frame in various ways. For example, the AR pose system 102 determines that a segment of the retargeted reference body frame overlays a segment of the subject body frame in response to determining that joints at both ends of the retargeted reference body frame segment are located at the same positions (e.g., positional coordinates) as joints at both ends of the subject body frame segment. Additionally, or alternatively, the AR pose system 102 generates vectors representing each segment of the retargeted reference body frame within a vector space. The AR pose system 102 further generates vectors representing each segment of the subject body frame within the same vector space. The AR pose system 102 then determines whether any of the vectors between both body frames occupy the same locations within the vector space.

In one embodiment, the AR pose system 102 determines that a portion of the retargeted reference body frame overlays a portion of the subject body frame based on a total overlap of the respective portions. For example, the AR pose system 102 determines that the respective portions overlap if both portions have the same starting and ending coordinate points—meaning that both portions have the same length and positioning relative to the subject in the camera viewfinder. Additionally, or alternatively, the AR pose system 102 determines that a portion of the retargeted reference body frame overlays a portion of the subject body frame based on a threshold amount of overlap of the respective portions. For example, the AR pose system 102 determines that a segment of the retargeted reference body frame overlays a segment of the subject body frame if both segments have the same starting coordinates and if the ending points of both segments are within a threshold angle (e.g., ten degrees). Similarly, the AR pose system 102 determines that a segment of the retargeted reference body frame overlay a segment of the subject body frame if both segments have the same starting coordinates and if the ending points of both segments are within a threshold distance (e.g., within ten pixels).

Next, in response to determining that a portion of the retargeted reference body frame overlays a portion of the subject body frame, the AR pose system 102 determines if the overlaying portions correspond. In one embodiment, the AR pose system 102 determines that the overlaying portions correspond based on segment tags associated with each body frame. For example, as mentioned above, the AR pose system 102 generates the body frames utilizing pose neural network which outputs the segments and joints of the body frames along with tags identifying the segments and joints (e.g., "femur segment," "hip joint," "shin segment," "ankle joint"). Accordingly, the AR pose system 102 determines that body frame portions correspond when the tags associated with the one or more segments and/or joints in the body frame portions match.

Finally, in response to determining that at least one portion of the retargeted reference body frame overlays a corresponding portion of the subject body frame, the AR pose system 102 performs an act 518 of modifying a display characteristic of the determined portion of the retargeted reference body frame. For example, as discussed above, the AR pose system 102 modifies a display characteristic of the determined portion by modifying one or more of: a display color of the portion, a line type of the portion, or a line width of the portion. Additionally, or alternatively, the AR pose system 102 causes the portion to flash on and off, and/or depict another type of animation to indicate the alignment. It will be understood that the AR pose system 102 modifies the display characteristic of the determined portion of the visualization of the retargeted reference body frame overlaid on the camera viewfinder of the client computing device 108 such that the user of the client computing device 108 understands that the corresponding portion of the subject's body is in alignment with the pose guide indicated by the visualization of the retargeted reference body frame.

Figure 6:
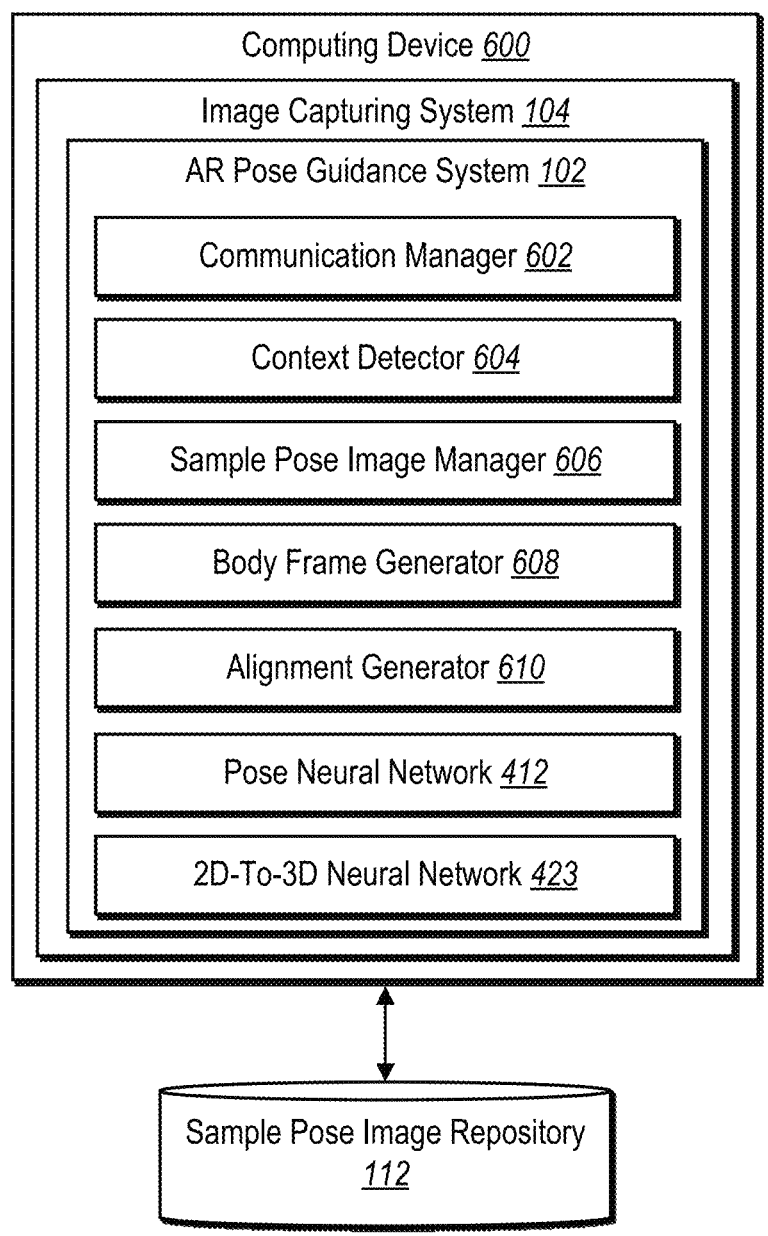
FIG. 6 illustrates a schematic diagram of the AR pose system in accordance with one or more embodiments.

FIG. 6 illustrates a detailed schematic diagram of an embodiment of the AR pose system 102 operating on a computing device 600 in accordance with one or more embodiments. As discussed above, the AR pose system 102 is operable on a variety of computing devices. Thus, for example, the computing device 600 is optionally the server(s) 106 and/or the client computing device 108. In one or more embodiments, the AR pose system 102 includes a communication manager 602, a context detector 604, a sample pose image manager 606, a body frame generator 608, an alignment manager 610, and the pose neural network 412. Additionally, the AR pose system 102 corresponds with and/or is connected with the sample pose image repository 112.

As mentioned above, and as shown in FIG. 6, the AR pose system 102 includes the communication manager 602. In one or more embodiments, the communication manager 602 handles communications between the AR pose system 102 and other devices and components within the environment 100 illustrated in FIG. 1. For example, when the AR pose system 102 resides on the server(s) 106, the communication manager 602 handles communications between the AR pose system 102 and the client computing device 108. To illustrate, the communication manager 602 receives data from the client computing device 108 including indications of user interactions (e.g., a user selection of a sample pose image), and one or more digital images from the camera viewfinder stream of the client computing device 108. The communication manager 602 further provides data to the client computing device 108 including the interactive overlay of sample pose images and the AR pose guide.

As mentioned above, and as shown in FIG. 6, the AR pose system 102 includes the context detector 604. In one or more embodiments, the context detector 604 utilizes one or more detectors (e.g., an object detector, an attire detector) including one or more neural networks, algorithms, and/or machine learning models to generate tags associated with a digital image from a camera viewfinder stream of the client computing device 108. The context detector 604 further determines the context of the digital image based on the generated tags utilizing natural language processing to arrange the generated tags in a logical order. In at least one embodiment, the context detector 604 selects unique and/or relevant tags in order to determine the context of the digital image.

As mentioned above, and as shown in FIG. 6, the AR pose system 102 includes the sample pose image manager 606. In one or more embodiments, the sample pose image manager 606 utilizes the determined context of the digital image extracted from the camera viewfinder stream to generate a collection of sample pose images tailored to the determined context. For example, the sample pose image manager 606 utilizes the determined context to generate a search query. The sample pose image manager 606 further provides the search query to one or more search engines and/or repositories to receive a collection of sample pose images. In at least one embodiment, the sample pose image manager 606 generates a diverse subset of the collection of sample pose images utilizing one or more clustering techniques such as k-means clustering.

As mentioned above, and as shown in FIG. 6, the AR pose system 102 includes the body frame generator 608. In one or more embodiments, the body frame generator 608 utilizes the pose neural network 412 in connection with the 2D-to-3D neural network 423 to generate one or more body frames. For example, the body frame generator 608 utilizes the pose neural network 412 in connection with the 2D-to-3D neural network 423 to generate a reference body frame based on a subject depicted in a selected sample pose image. The body frame generator 608 further utilizes the pose neural network 412 in connection with the 2D-to-3D neural network 423 to generate a subject body frame based on the subject depicted in the camera viewfinder stream of the client computing device 108. The body frame generator 608 further retargets a reference body frame based on proportions of the subject depicted in the camera viewfinder stream (e.g., as represented by the corresponding subject body frame), such that the retargeted reference body frame retains its original pose but with the proportions of the subject depicted in the camera viewfinder stream.

As mentioned above, and as shown in FIG. 6, the AR pose system 102 includes the alignment manager 610. In one or more embodiments, the alignment manager 610 determines alignments between portions of a retargeted reference body frame and the subject depicted in the camera viewfinder stream of the client computing device 108. The alignment manager 610 further modifies display characteristics of a visualization of the retargeted reference body frame in response to determined alignments. In response to determining a total alignment between the retargeted reference body frame and the subject, the alignment manager 610 automatically captures a digital image from the camera viewfinder stream of the client computing device 108.

Each of the components 412, 423, 602-610 of the AR pose system 102 includes software, hardware, or both. For example, the components 412, 423, 602-610 includes one or more instructions stored on a computer-readable storage medium and executable by processors of one or more computing devices, such as a client device or server device. When executed by the one or more processors, the computer-executable instructions of the AR pose system 102 causes the computing device(s) to perform the methods described herein. Alternatively, the components 412, 423, 602-610 includes hardware, such as a special-purpose processing device to perform a certain function or group of functions. Alternatively, the components 412, 423, 602-610 of AR pose system 102 includes a combination of computer-executable instructions and hardware.

Furthermore, the components 412, 423, 602-610 of the AR pose system 102 may, for example, be implemented as one or more operating systems, as one or more stand-alone applications, as one or more modules of an application, as one or more plug-ins, as one or more library functions or functions that may be called by other applications, and/or as a cloud-computing model. Thus, the components 412, 423, 602-610 may be implemented as a stand-alone application, such as a desktop or mobile application. Furthermore, the components 412, 423, 602-610 may be implemented as one or more web-based applications hosted on a remote server. The components 412, 423, 602-610 may also be implemented in a suite of mobile device applications or "apps." To illustrate, the components 412, 423, 602-610 may be implemented in an application, including but not limited to ADOBE CREATIVE CLOUD, such as ADOBE PHOTOSHOP or ADOBE PHOTOSHOP CAMERA. "ADOBE", "CREATIVE CLOUD", "PHOTOSHOP", and "PHOTOSHOP CAMERA" are either registered trademarks or trademarks of Adobe Systems Incorporated in the United States and/or other countries.

Figure 7:
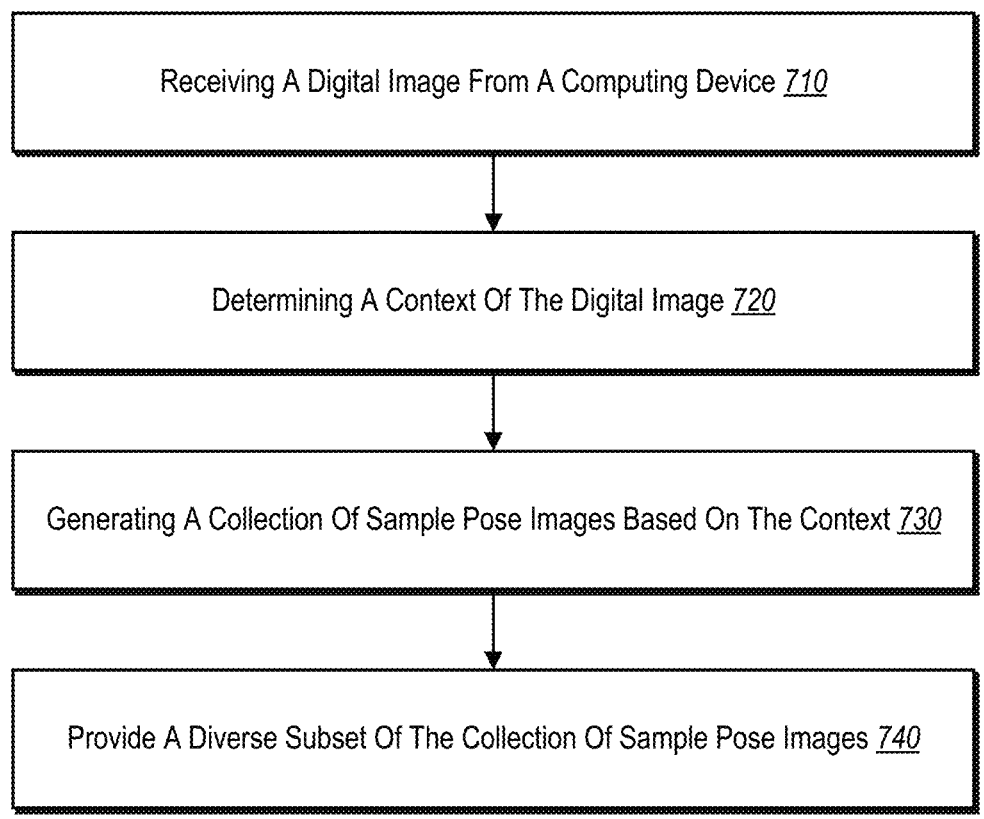
FIG. 7 illustrates a flowchart of a series of acts for generating an interactive overlay of contextually-tailored sample pose images in accordance with one or more embodiments.
Figure 8:
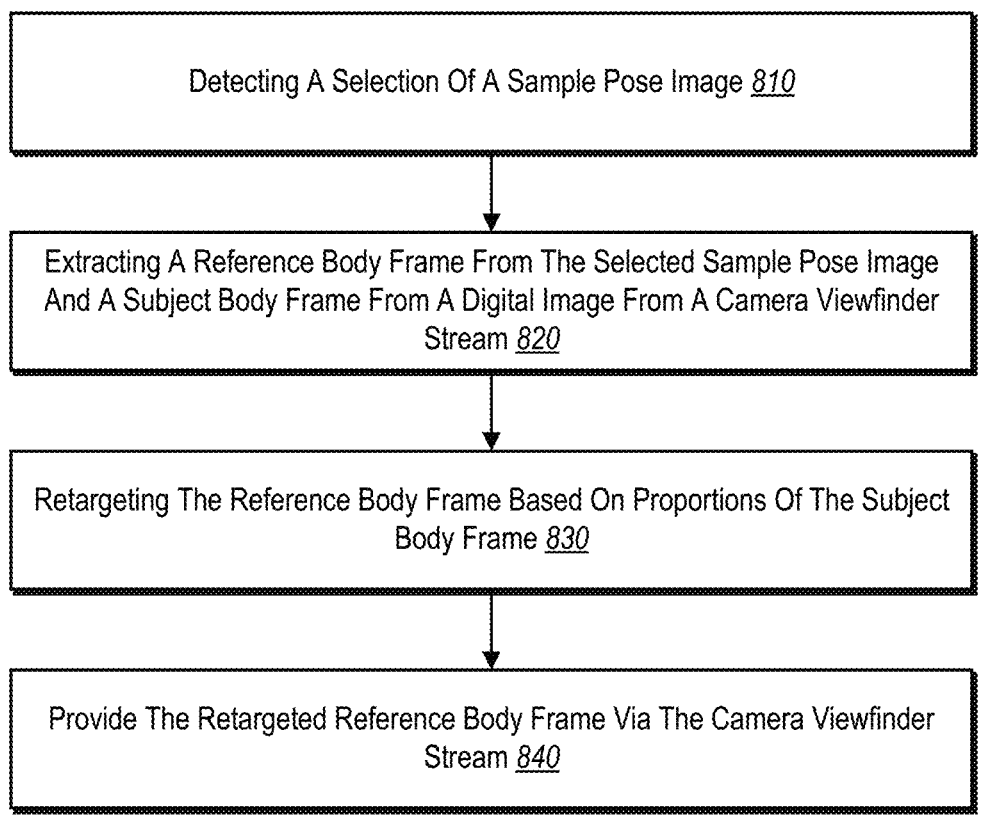
FIG. 8 illustrates a flowchart of a series of acts for generating an augmented reality pose guide in accordance with one or more embodiments.
Figure 9:
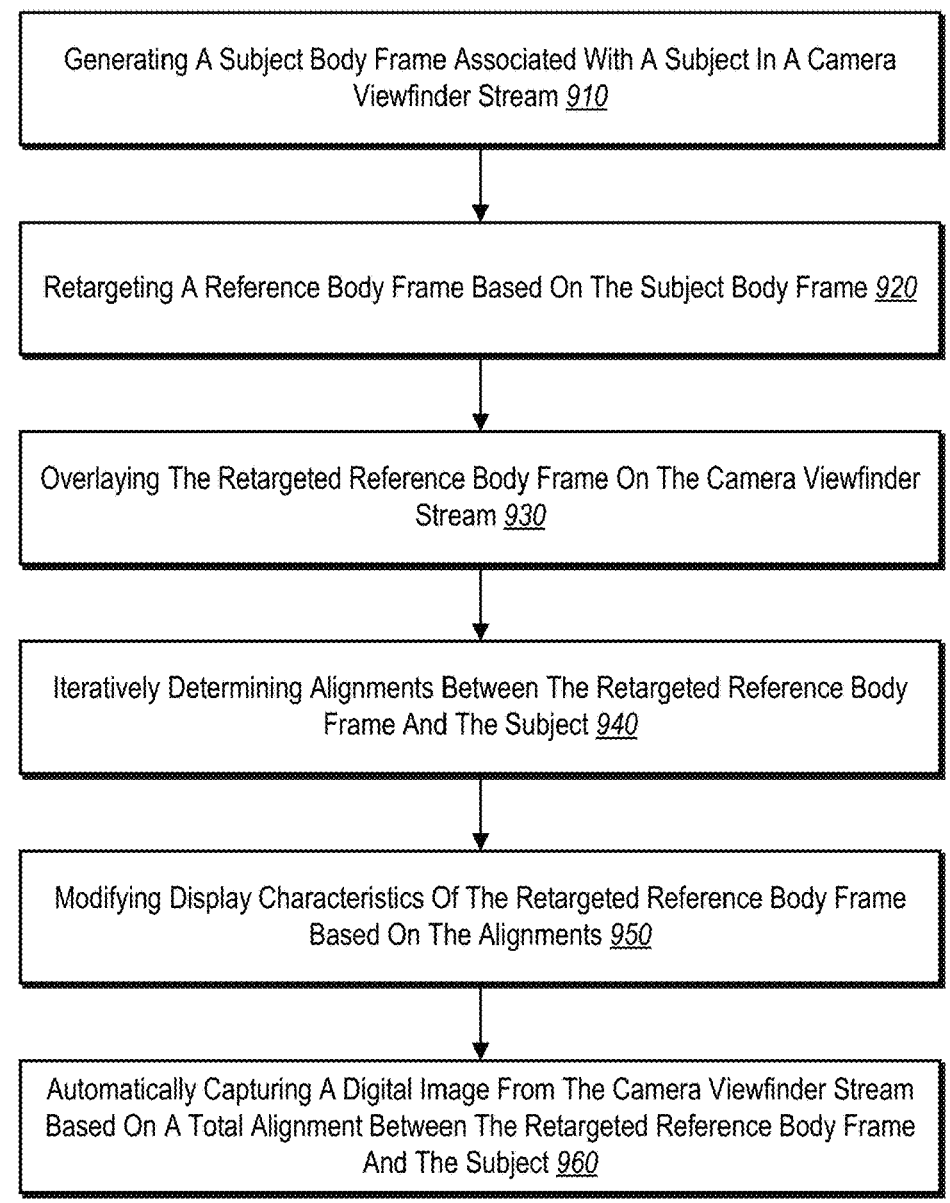
FIG. 9 illustrates a flowchart of another series of acts for automatically capturing a digital image in response to determining total alignment between a subject depicted in a camera viewfinder stream and a pose guide in accordance with one or more embodiments.

FIGS. 1-6, the corresponding text, and the examples provide a number of different methods, systems, devices, and non-transitory computer-readable media of the AR pose system 102. In addition to the foregoing, one or more embodiments can also be described in terms of flowcharts comprising acts for accomplishing a particular result, as shown in FIGS. 7, 8, and 9. FIGS. 7, 8, and 9 may be performed with more or fewer acts. Further, the acts may be performed in differing orders. Additionally, the acts described herein may be repeated or performed in parallel with one another or parallel with different instances of the same or similar acts.

As mentioned, FIG. 7 illustrates a flowchart of a series of acts 700 for generating an interactive overlay of contextually-tailored sample pose images in accordance with one or more embodiments. While FIG. 7 illustrates acts according to one embodiment, alternative embodiments may omit, add to, reorder, and/or modify any of the acts shown in FIG. 7. The acts of FIG. 7 can be performed as part of a method. Alternatively, a non-transitory computer-readable medium can comprise instructions that, when executed by one or more processors, cause a computing device to perform the acts of FIG. 7. In some embodiments, a system can perform the acts of FIG. 7.

As shown in FIG. 7, the series of acts 700 includes an act 710 of receiving a digital image from a computing device. For example, the act 710 involves receiving a digital image from a camera viewfinder stream of the computing device. In one or more embodiments, receiving the digital image from the camera viewfinder stream is in response to a detected selection of an entry point option displayed in connection with the camera viewfinder stream on the computing device.

As shown in FIG. 7, the series of acts 700 includes an act 720 of determining a context of the digital image. For example, the act 720 involves determining a context of the digital image based on a subject and a scene depicted within the digital image. In one or more embodiments, determining the context of the digital image includes: generating one or more object tags associated with the digital image; generating a gender tag for each human depicted in the digital image; generating one or more attire tags for each human depicted in the digital image; and determining the context of the digital image based on the one or more object tags, the gender tag for each human depicted in the digital image, and the one or more attire tags for each human depicted in the digital image.

As shown in FIG. 7, the series of acts 700 includes an act 730 of generating a collection of sample pose images based on the context. For example, the act 730 involves generating a collection of sample pose images corresponding to the context of the digital image. In one or more embodiments, generating the collection of sample pose image includes: generating a search query based on the one or more object tags, the gender tag for each human depicted in the digital image, and the one or more attire tags for each human depicted in the digital image; and receiving the collection of sample pose images in response to providing the search query to one or more search engines.

In one or more embodiments, the series of acts 700 includes an act of determining the diverse subset of the collection of sample pose images by: generating feature vectors for the sample pose images in the collection of sample pose images; clustering the feature vectors to determine one or more classes of sample pose images; selecting a feature vector from each of the one or more classes of sample pose images; and determining the diverse subset of the collection of sample pose images as sample pose images corresponding to the selected feature vectors.

As shown in FIG. 7, the series of acts 700 includes an act 740 of provide a diverse subset of the collection of sample pose images. For example, the act 740 involves providing a diverse subset of the collection of sample pose images for display via an interactive overlay positioned on a camera viewfinder of the computing device. In one or more embodiments, providing the diverse subset of the collection of sample pose image for display includes: generating the interactive overlay comprising a scrollable display of the diverse subset of the collection of sample pose images, wherein each of the sample pose images in the scrollable display is selectable; and positioning the interactive overlay over a lower portion of the camera viewfinder of the computing device. In at least one embodiment, generating the interactive overlay further comprises providing an indication of the context of the digital image within the interactive overlay.

As mentioned, FIG. 8 illustrates a flowchart of a series of acts 800 for generating an augmented reality pose guide in accordance with one or more embodiments. While FIG. 8 illustrates acts according to one embodiment, alternative embodiments may omit, add to, reorder, and/or modify any of the acts shown in FIG. 8. The acts of FIG. 8 can be performed as part of a method. Alternatively, a non-transitory computer-readable medium can comprise instructions that, when executed by one or more processors, cause a computing device to perform the acts of FIG. 8. In some embodiments, a system can perform the acts of FIG. 8.

As shown in FIG. 8, the series of acts 800 includes an act 810 of detecting a selection of a sample pose image. For example, the act 810 involves detecting a selection of a sample pose image from an interactive overlay positioned on a camera viewfinder of a client computing device.

As shown in FIG. 8, the series of acts 800 includes an act 820 of extracting a reference body frame from the selected sample pose image and a subject body frame from a digital image from a camera viewfinder stream. For example, the act 820 involves utilizing the pose neural network to: extract a first reference body frame from the selected sample pose image, and extract a first subject body frame from a digital image from a camera viewfinder stream of the client computing device.

As shown in FIG. 8, the series of acts 800 includes an act 830 of retargeting the reference body frame based on proportions of the subject body frame. For example, the act 830 involves retargeting the first reference body frame to include proportions of the first subject body frame in a pose of the first reference body frame. In one or more embodiments, retargeting the first reference body frame to include the proportions of the first subject body frame in the pose of the first reference body frame includes: determining lengths of segments between joints of the first subject body frame; and modifying lengths of segments between joints of the first reference body frame to match the lengths of the segments between corresponding joints of the first subject body frame.

As shown in FIG. 8, the series of acts 800 includes an act 840 of provide the retargeted reference body frame via the camera viewfinder stream. For example, the act 840 involves providing the retargeted first reference body frame aligned to a first subject in the camera viewfinder stream. In one or more embodiments, providing the retargeted first reference body frame aligned to the first subject in the camera viewfinder stream is based on at least one landmark relative to the first subject. In at least one embodiment, providing the retargeted first reference body frame aligned to the first subject in the camera viewfinder stream based on at least one landmark relative to the first subject includes: determining the at least one landmark of the first subject in the camera viewfinder stream; generating a visualization of the retargeted first reference body frame; and providing the visualization of the retargeted first reference body frame on the camera viewfinder stream by anchoring at least one predetermined point of the visualization of the retargeted first reference body frame to the at least one landmark of the first subject. For example, determining the at least one landmark of the first subject includes determining at least one of: a hip region of the first subject, and a torso region of the first subject.

In at least one embodiment, the series of acts 800 includes an act of utilizing the pose neural network to: extract a second reference body frame from the selected sample pose image, and extract a second subject body frame from a digital image from the camera viewfinder stream of the client computing device. The series of acts 800 further includes acts of: retargeting the second reference body frame to comprise proportions of the second subject body frame in a pose of the second reference body frame; and providing the retargeted second reference body frame aligned to a second subject in the camera viewfinder stream based on at least one landmark relative to the second subject.

As mentioned, FIG. 9 illustrates a flowchart of a series of acts 900 for automatically capturing a digital image in response to determining total alignment between a subject depicted in a camera viewfinder stream and a pose guide in accordance with one or more embodiments. While FIG. 9 illustrates acts according to one embodiment, alternative embodiments may omit, add to, reorder, and/or modify any of the acts shown in FIG. 9. The acts of FIG. 9 can be performed as part of a method. Alternatively, a non-transitory computer-readable medium can comprise instructions that, when executed by one or more processors, cause a computing device to perform the acts of FIG. 9. In some embodiments, a system can perform the acts of FIG. 9.

As shown in FIG. 9, the series of acts 900 includes an act 910 of generating a subject body frame associated with a subject in a camera viewfinder stream. For example, the act 910 involves generating a subject body frame associated with a subject depicted in a camera viewfinder stream of the client computing device. In one or more embodiments, the series of acts 900 further includes an act of providing the sample pose image in response to determining that the sample pose image corresponds to a context of the camera viewfinder stream; and wherein generating the subject body frame is in response to a detected selection of the sample pose image.

As shown in FIG. 9, the series of acts 900 includes an act 920 of retargeting a reference body frame based on the subject body frame. For example, the act 920 involves retargeting, based on the subject body frame, a reference body frame extracted from a sample pose image.

As shown in FIG. 9, the series of acts 900 includes an act 930 of overlaying the retargeted reference body frame on the camera viewfinder stream. For example, the act 930 involves overlaying the retargeted reference body frame on the camera viewfinder stream by anchoring the retargeted reference body frame to the subject. In at least one embodiment, the acts 900 further includes overlaying the subject body frame on the camera viewfinder stream by anchoring the subject body frame to the subject. For example, anchoring the retargeted reference body frame to the subject includes anchoring at least a hip region of the retargeted reference body frame to a hip region of the subject; and anchoring the subject body frame to the subject includes anchoring at least a hip region of the subject body frame to the hip region of the subject As shown in FIG. 9, the series of acts 900 includes an act 940 of iteratively determining alignments between the retargeted reference body frame and the subject. For example, the act 940 involves iteratively determining an alignment between portions the retargeted reference body frame and portions of the subject depicted in the camera viewfinder stream. In one or more embodiments, iteratively determining an alignment between portions the retargeted reference body frame and portions of the subject depicted in the camera viewfinder stream includes iteratively determining that at least one segment of the retargeted reference body frame anchored to the subject overlays a corresponding at least one segment of the subject body frame anchored to the subject. Furthermore, the series of acts 900 can further include an act of determining that the portions of the retargeted reference body frame and portions of the subject are aligned by determining that each portion of the retargeted reference body frame is aligned with a corresponding portion of the subject body frame anchored to the subject.

As shown in FIG. 9, the series of acts 900 includes an act 950 of modifying display characteristics of the retargeted reference body frame based on the alignments. For example, the act 950 involves, for each determined alignment, modifying a display characteristic of the retargeted reference body frame to indicate the alignment. In one or more embodiments, modifying the display characteristic of the retargeted reference body frame includes modifying at least one of: a display color of the portion of the retargeted reference body frame in alignment with a corresponding portion of the subject, a line type of the portion of the retargeted reference body frame in alignment with the corresponding portion of the subject, and a line width of the portion of the retargeted reference body frame in alignment with the corresponding portion of the subject.

As shown in FIG. 9, the series of acts 900 includes an act 960 of automatically capturing a digital image from the camera viewfinder stream based on a total alignment between the retargeted reference body frame and the subject. For example, the act 960 involves, in response to determining that the portions of the retargeted reference body frame and portions of the subject are aligned, automatically capturing a digital image from the camera viewfinder stream.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., memory), and executes those instructions, thereby performing one or more processes, including one or more of the processes described herein.

Computer-readable media are any available media that is accessible by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which are used to store desired program code means in the form of computer-executable instructions or data structures and which are accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media includes a network and/or data links which are used to carry desired program code means in the form of computer-executable instructions or data structures and which are accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed by a general-purpose computer to turn the general-purpose computer into a special purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. As used herein, the term "cloud computing" refers to a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In addition, as used herein, the term "cloud-computing environment" refers to an environment in which cloud computing is employed.

Figure 10:
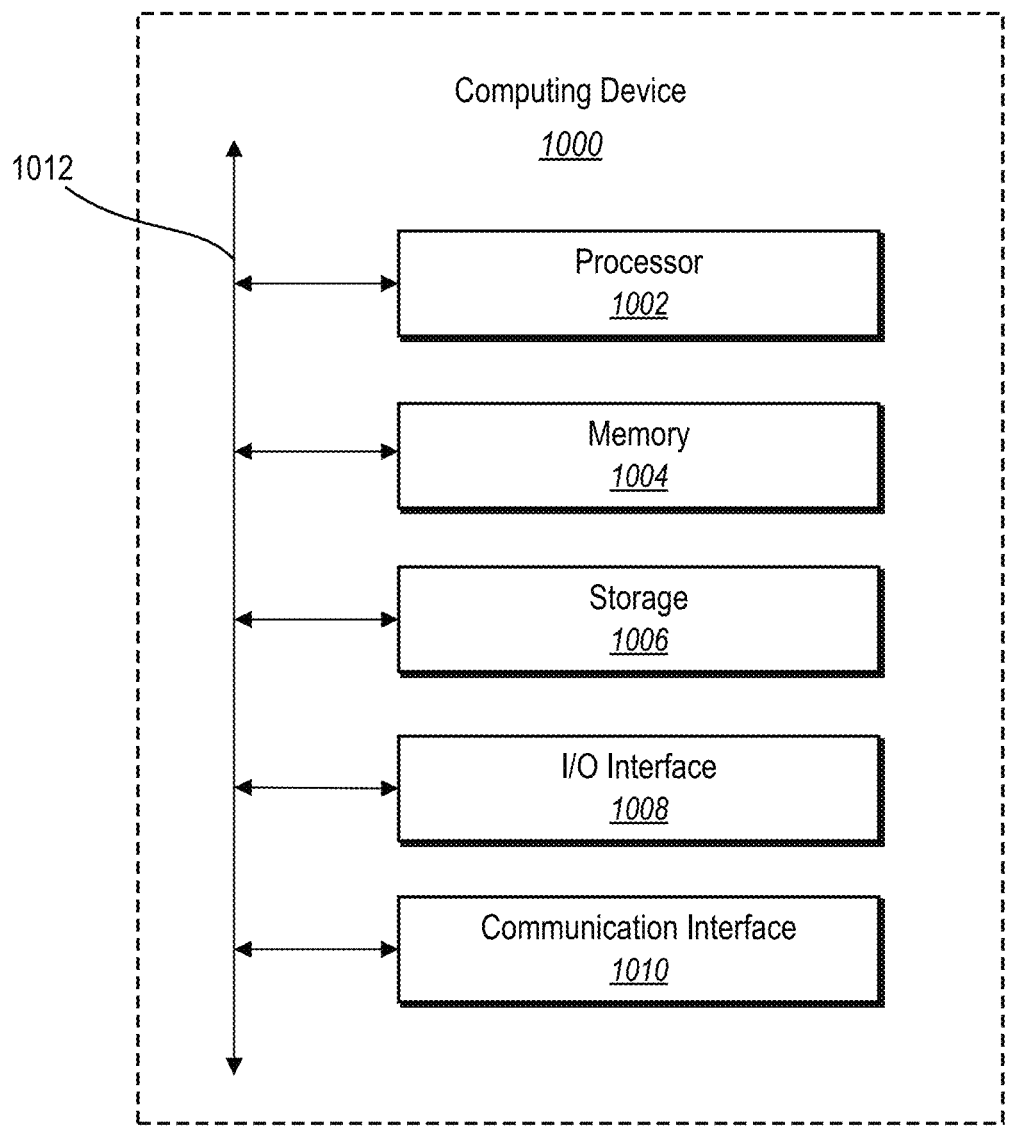
FIG. 10 illustrates a block diagram of an example computing device for implementing one or more embodiments of the present disclosure.

FIG. 10 illustrates a block diagram of an example computing device 1000 that may be configured to perform one or more of the processes described above. One will appreciate that one or more computing devices, such as the computing device 1000 may represent the computing devices described above (e.g., the server(s) 106, the client computing device 108). In one or more embodiments, the computing device 1000 may be a mobile device (e.g., a mobile telephone, a smartphone, a PDA, a tablet, a laptop, a camera, a tracker, a watch, a wearable device, etc.). In some embodiments, the computing device 1000 may be a non-mobile device (e.g., a desktop computer or another type of client computing device). Further, the computing device 1000 may be a server device that includes cloud-based processing and storage capabilities.

As shown in FIG. 10, the computing device 1000 includes one or more processor(s) 1002, memory 1004, a storage device 1006, input/output interfaces 1008 (or "I/O interfaces 1008"), and a communication interface 1010, which may be communicatively coupled by way of a communication infrastructure (e.g., bus 1012). While the computing device 1000 is shown in FIG. 10, the components illustrated in FIG. 10 are not intended to be limiting. Additional or alternative components may be used in other embodiments. Furthermore, in certain embodiments, the computing device 1000 includes fewer components than those shown in FIG. 10. Components of the computing device 1000 shown in FIG. 10 will now be described in additional detail.

In particular embodiments, the processor(s) 1002 includes hardware for executing instructions, such as those making up a computer program. As an example, and not by way of limitation, to execute instructions, the processor(s) 1002 may retrieve (or fetch) the instructions from an internal register, an internal cache, memory 1004, or a storage device 1006 and decode and execute them.

The computing device 1000 includes memory 1004, which is coupled to the processor(s) 1002. The memory 1004 may be used for storing data, metadata, and programs for execution by the processor(s). The memory 1004 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 1004 may be internal or distributed memory.

The computing device 1000 includes a storage device 1006 includes storage for storing data or instructions. As an example, and not by way of limitation, the storage device 1006 includes a non-transitory storage medium described above. The storage device 1006 may include a hard disk drive (HDD), flash memory, a Universal Serial Bus (USB) drive or a combination these or other storage devices.

As shown, the computing device 1000 includes one or more I/O interfaces 1008, which are provided to allow a user to provide input to (such as user strokes), receive output from, and otherwise transfer data to and from the computing device 1000. These I/O interfaces 1008 may include a mouse, keypad or a keyboard, a touch screen, camera, optical scanner, network interface, modem, other known I/O devices or a combination of such I/O interfaces 1008. The touch screen may be activated with a stylus or a finger.

The I/O interfaces 1008 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 1008 are configured to provide graphical data to a display for presentation to a user. The graphical data may be representative of one or more graphical user interfaces and/or any other graphical content as may serve a particular implementation.

The computing device 1000 can further include a communication interface 1010. The communication interface 1010 includes hardware, software, or both. The communication interface 1010 provides one or more interfaces for communication (such as, for example, packet-based communication) between the computing device and one or more other computing devices or one or more networks. As an example, and not by way of limitation, communication interface 1010 may include a network interface controller (NIC) or network adapter for communicating with an Ethernet or other wire-based network or a wireless NIC (WNIC) or wireless adapter for communicating with a wireless network, such as a WI-FI. The computing device 1000 can further include a bus 1012. The bus 1012 includes hardware, software, or both that connects components of computing device 1000 to each other.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A computer-implemented method comprising:
receiving a digital image from a camera viewfinder stream of a computing device;
determining, utilizing a machine learning model, a context of the digital image indicating characteristics and attributes based on analyzing a subject and a scene depicted within the digital image, wherein the scene comprises at least one of a background environment, a sky region, additional subjects, vehicles, or animals;
generating a collection of sample pose images that portray one or more subjects in a pose and are contextually relevant to the context of the digital image in the camera viewfinder stream;
providing a diverse subset of the collection of sample pose images for display via an interactive overlay positioned on a camera viewfinder of the computing device; and
in response to a selection of a sample pose image from the diverse subset of the collection of sample pose images, providing an augmented reality pose guide positioned on the camera viewfinder based on body frames from both the camera viewfinder stream and the selection of the sample pose image.

2. The computer-implemented method as recited in claim 1, wherein determining the context of the digital image comprises:
generating one or more object tags associated with the digital image;
generating a gender tag for each human depicted in the digital image;
generating one or more attire tags for each human depicted in the digital image; and
determining the context of the digital image based on the one or more object tags, the gender tag for each human depicted in the digital image, and the one or more attire tags for each human depicted in the digital image.

3. The computer-implemented method as recited in claim 2, wherein generating the collection of sample pose images comprises:
generating a search query based on the one or more object tags, the gender tag for each human depicted in the digital image, and the one or more attire tags for each human depicted in the digital image; and receiving the collection of sample pose images in response to providing the search query to one or more search engines.

4. The computer-implemented method as recited in claim 1, wherein determining the diverse subset of the collection of sample pose images comprises:

generating feature vectors for the sample pose images in the collection of sample pose images;

clustering the feature vectors to determine one or more classes of sample pose images;

selecting a feature vector from each of the one or more classes of sample pose images; and determining the diverse subset of the collection of sample pose images as sample pose images corresponding to the selected feature vectors.

5. The computer-implemented method as recited in claim 1, wherein providing the diverse subset of the collection of sample pose images for display comprises:

generating the interactive overlay comprising a scrollable display of the diverse subset of the collection of sample pose images, wherein each of the sample pose images in the scrollable display is selectable; and positioning the interactive overlay over a lower portion of the camera viewfinder of the computing device.

6. The computer-implemented method as recited in claim 1, wherein generating the interactive overlay further comprises providing an indication of the context of the digital image indicating characteristics and attributes within the interactive overlay.

7. The computer-implemented method as recited in claim 1, further comprising receiving the digital image from the camera viewfinder stream in response to a detected selection of an entry point option displayed in connection with the camera viewfinder stream on the computing device.

8. A system comprising:

at least one computer memory device comprising a plurality of sample pose images and a pose neural network; and one or more servers configured to cause the system to:

detect a selection of a sample pose image from an interactive overlay positioned on a camera viewfinder of a client computing device;

utilize the pose neural network to:

extract a first reference body frame from the selected sample pose image, and extract a first subject body frame from a digital image from a camera viewfinder stream of the client computing device;

retarget the first reference body frame to comprise proportions of the first subject body frame in a pose of the first reference body frame; and provide the retargeted first reference body frame aligned to a first subject in the camera viewfinder stream.

9. The system as recited in claim 8, wherein the one or more servers are further configured to cause the system to retarget the first reference body frame to comprise the proportions of the first subject body frame in the pose of the first reference body frame by:

determining lengths of segments between joints of the first subject body frame; and modifying lengths of segments between joints of the first reference body frame to match the lengths of the segments between corresponding joints of the first subject body frame.

10. The system as recited in claim 8, wherein the one or more servers are further configured to cause the system to provide the retargeted first reference body frame aligned to the first subject in the camera viewfinder stream based on at least one landmark relative to the first subject.

11. The system as recited in claim 10, wherein the one or more servers are further configured to cause the system to provide the retargeted first reference body frame aligned to the first subject in the camera viewfinder stream based on at least one landmark relative to the first subject by:

determining the at least one landmark of the first subject in the camera viewfinder stream;

generating a visualization of the retargeted first reference body frame; and providing the visualization of the retargeted first reference body frame on the camera viewfinder stream by anchoring at least one predetermined point of the visualization of the retargeted first reference body frame to the at least one landmark of the first subject.

12. The system as recited in claim 11, wherein determining the at least one landmark of the first subject comprises determining at least one of: a hip region of the first subject, and a torso region of the first subject.

13. The system as recited in claim 8, wherein the one or more servers are further configured to cause the system to: utilize the pose neural network to:

extract a second reference body frame from the selected sample pose image, and extract a second subject body frame from a digital image from the camera viewfinder stream of the client computing device;

retarget the second reference body frame to comprise proportions of the second subject body frame in a pose of the second reference body frame; and provide the retargeted second reference body frame aligned to a second subject in the camera viewfinder stream based on at least one landmark relative to the second subject.

14. A non-transitory computer-readable storage medium comprising instructions that, when executed by at least one processor, cause the at least one processor to perform operations comprising:

receiving a digital image from a camera viewfinder stream of a computing device;

determining, utilizing a machine learning model, a context of the digital image indicating characteristics and attributes based on analyzing a subject and a scene depicted within the digital image, wherein the scene comprises at least one of a background environment, a sky region, additional subjects, vehicles, or animals;

generating a collection of sample pose images that portray one or more subjects in a pose and are contextually relevant to the context of the digital image in the camera viewfinder stream;

providing a diverse subset of the collection of sample pose images for display via an interactive overlay positioned on a camera viewfinder of the computing device; and in response to a selection of a sample pose image from the diverse subset of the collection of sample pose images, providing an augmented reality pose guide positioned on the camera viewfinder based on body frames from both the camera viewfinder stream and the selection of the sample pose image.

15. The non-transitory computer-readable storage medium as recited in claim 14, wherein determining the context of the digital image comprises:

generating one or more object tags associated with the digital image;

generating a gender tag for each human depicted in the digital image;

generating one or more attire tags for each human depicted in the digital image; and determining the context of the digital image based on the one or more object tags, the gender tag for each human depicted in the digital image, and the one or more attire tags for each human depicted in the digital image.

16. The non-transitory computer-readable storage medium as recited in claim 15, wherein generating the collection of sample pose images comprises:

generating a search query based on the one or more object tags, the gender tag for each human depicted in the digital image, and the one or more attire tags for each human depicted in the digital image; and receiving the collection of sample pose images in response to providing the search query to one or more search engines.

17. The non-transitory computer-readable storage medium as recited in claim 14, wherein determining the diverse subset of the collection of sample pose images comprises:

generating feature vectors for the sample pose images in the collection of sample pose images;

clustering the feature vectors to determine one or more classes of sample pose images;

selecting a feature vector from each of the one or more classes of sample pose images; and determining the diverse subset of the collection of sample pose images as sample pose images corresponding to the selected feature vectors.

18. The non-transitory computer-readable storage medium as recited in claim 14, wherein providing the diverse subset of the collection of sample pose images for display comprises:

generating the interactive overlay comprising a scrollable display of the diverse subset of the collection of sample pose images, wherein each of the sample pose images in the scrollable display is selectable; and positioning the interactive overlay over a lower portion of the camera viewfinder of the computing device.

19. The non-transitory computer-readable storage medium as recited in claim 14, wherein generating the interactive overlay further comprises providing an indication of the context of the digital image indicating characteristics and attributes within the interactive overlay.

20. The non-transitory computer-readable storage medium as recited in claim 14, wherein the operations further comprise receiving the digital image from the camera viewfinder stream in response to a detected selection of an entry point option displayed in connection with the camera viewfinder stream on the computing device.

* * * * *